US012778094B2

(12) United States Patent
Hancock

(10) Patent No.: US 12,778,094 B2
(45) Date of Patent: *Nov. 3, 2026

(54) LURE WITH REFLECTORS

(71) Applicant: RMB Importing, LLC, Fort Atkinson, WI (US)

(72) Inventor: Robin Hancock, Elkhorn, WI (US)

(73) Assignee: RMB Importing, LLC, Fort Atkinson, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 19/060,007

(22) Filed: Feb. 21, 2025

(65) Prior Publication Data

US 2025/0302019 A1 Oct. 2, 2025

Related U.S. Application Data

(63) Continuation of application No. 18/740,760, filed on Jun. 12, 2024, now Pat. No. 12,239,114, which is a continuation-in-part of application No. 18/621,354, filed on Mar. 29, 2024, now Pat. No. 12,349,667.

(51) Int. Cl.
*A01K 85/01* (2006.01)
*A01K 85/00* (2006.01)

(52) U.S. Cl.
CPC ........ *A01K 85/011* (2022.02); *A01K 85/1851* (2022.02)

(58) Field of Classification Search
CPC .. A01K 85/013; A01K 85/011; A01K 85/012; A01K 85/01; A01K 85/018; A01K 85/1833; A01K 85/1851
USPC ........... 43/42.32, 42.33, 42.34, 42.06, 42.39, 43/44.81
See application file for complete search history.

(56) References Cited

U.S. PATENT DOCUMENTS

| | | | | | |
|---|---|---|---|---|---|
| 497,962 | A | * | 5/1893 | D'Ivernois | A01K 85/00 43/44.81 |
| 1,242,556 | A | | 10/1917 | Jay | |
| 1,608,375 | A | | 11/1926 | Dewey | |
| 1,692,222 | A | * | 11/1928 | Pagin | B05D 5/06 427/259 |
| 1,787,733 | A | * | 1/1931 | Pagin | A01K 85/16 43/42.34 |
| 1,847,397 | A | * | 3/1932 | Hofschneider | A01K 85/14 43/42.34 |
| 1,862,893 | A | | 6/1932 | Holtzclaw | |

(Continued)

FOREIGN PATENT DOCUMENTS

KR 20190002463 U 10/2019

OTHER PUBLICATIONS

Website screenshot of Rapala Rippin 'Rap, Website screenshot of Rapala Rapala Rippin Rap Amazon page; https://shorturl.at/Jjnxk; obtained on Feb. 21, 2025 (prior art for purposes of prosecution).

*Primary Examiner* — Maria E Graber

(74) *Attorney, Agent, or Firm* — Shane Delsman; Godfrey & Kahn, S.C.

(57) ABSTRACT

A lure having a body with a line tie and one or more hooks attached to the body. The body includes pockets which are reflective such as by attaching a reflective material to the back wall of the pockets to make the lure more visible to a fish. Some prior art lures are not designed to reflect light or reflect light in one or a small number of directions.

21 Claims, 24 Drawing Sheets

(56) References Cited

U.S. PATENT DOCUMENTS 1,865,360 A * 6/1932 Eger ...................... A01K 85/16 43/42.34
2,117,206 A * 5/1938 Neff ..................... A01K 85/012 43/42.34
2,241,941 A * 5/1941 Bates ..................... A01K 85/16 43/42.48
2,338,577 A 1/1944 Divine
2,480,580 A 8/1949 Hopkins
2,503,607 A 4/1950 Arff
2,594,673 A 4/1952 Nichols
2,657,495 A 11/1953 Eppinger
2,736,125 A 2/1956 Perkins
2,765,570 A 10/1956 Sedivy
2,765,571 A * 10/1956 Sinclair .................. A01K 85/16 43/42.34
3,021,636 A 2/1962 Gowdy
3,040,465 A 6/1962 Gierat
D216,882 S * 3/1970 Clink ........................... 43/42.39
3,528,189 A 9/1970 Lilley, Jr.
3,579,893 A * 5/1971 Wolfe .................... A01K 93/02 441/20
3,631,625 A * 1/1972 Castner .................. A01K 85/16 359/489.15
3,750,321 A * 8/1973 McClellan ............. A01K 85/00 43/42.32
3,851,947 A 12/1974 Montgomery
3,854,234 A 12/1974 Hardin
3,855,722 A * 12/1974 Moore ................... A01K 85/00 43/42.34
3,909,974 A * 10/1975 Kent ...................... A01K 85/00 43/42.31
4,045,903 A * 9/1977 Parker .................... A01K 85/00 43/42.31
4,081,667 A 3/1978 Lewin et al.
4,176,490 A 12/1979 Philips
4,199,888 A 4/1980 Barnes
4,495,722 A * 1/1985 Hess ...................... A01K 85/16 43/42.47
4,631,854 A * 12/1986 Rosko .................... A01K 85/00 43/42.34
4,700,504 A * 10/1987 Mattison ................ A01K 85/16 43/42.47
4,712,326 A * 12/1987 Hoover .................. A01K 85/01 43/42.31
D299,944 S * 2/1989 Haavig ........................ D22/126
4,807,383 A * 2/1989 Delwiche ............... A01K 85/00 43/17.5
D322,835 S * 12/1991 Snyder ......................... D22/144
5,077,930 A * 1/1992 Berry ..................... A01K 85/14 43/42.22
5,097,621 A * 3/1992 Hnizdor ................. A01K 85/00 43/42.34
D335,329 S * 5/1993 Winesett, Jr. ................ D22/129
5,245,782 A * 9/1993 Pahle ..................... A01K 85/00 43/42.34
5,349,776 A * 9/1994 Lucas .................... A01K 85/00 43/42.39
5,564,220 A * 10/1996 Blicha .................... A01K 85/00 43/42.32
5,588,246 A 12/1996 Hill
5,649,384 A * 7/1997 Manning ................ A01K 85/00 43/42.39
5,673,508 A * 10/1997 Snyder ................... A01K 83/00 43/44.8
5,926,993 A 7/1999 Marusak et al.
D425,962 S * 5/2000 Tognacci ..................... D22/132
6,115,956 A 9/2000 Firmin
6,158,161 A 12/2000 Rossman
6,173,523 B1 1/2001 Johnson
D466,966 S * 12/2002 Lawton ........................ D22/132
D472,293 S * 3/2003 Clark ........................... D22/128
D498,287 S * 11/2004 West ............................ D22/132
6,836,997 B2 1/2005 Cramsey
D611,119 S * 3/2010 Renosky ...................... D22/144
7,934,339 B2 * 5/2011 Richie .................... A01K 85/01 43/42.32
D642,237 S * 7/2011 Simmons ..................... D22/144
8,079,173 B2 * 12/2011 Corbitt, III ............ A01K 85/00 43/42.31
8,601,737 B2 12/2013 Beer et al.
9,010,015 B2 * 4/2015 Lorentz .................. A01K 85/00 43/42.39
10,244,741 B1 * 4/2019 Hancock ................ A01K 85/16
10,925,268 B1 2/2021 Flasco
11,602,138 B2 3/2023 Gudwer
11,889,824 B2 2/2024 Henderson et al.
D1,032,775 S * 6/2024 Peterson ...................... D22/133
12,239,114 B1 * 3/2025 Hancock .............. A01K 85/011
2007/0163165 A1 7/2007 Castro et al.
2007/0199233 A1 * 8/2007 Higgin ................... A01K 85/16 43/42.31
2008/0163539 A1 7/2008 Choi
2009/0077859 A1 * 3/2009 Aylsworth ............. A01K 85/00 29/527.5
2022/0394962 A1 12/2022 Medinas
2023/0031006 A1 2/2023 Yagi
2023/0065290 A1 3/2023 Yagi
2023/0122035 A1 4/2023 Yagi
2023/0210098 A1 7/2023 Phillips
2024/0041013 A1 * 2/2024 McKenzie ........... A01K 85/011
2024/0156073 A1 * 5/2024 Terrell ................... A01K 83/00

* cited by examiner

LURE WITH REFLECTORS

CROSS REFERENCE TO RELATED APPLICATION

This continuation application is based on and claims the benefit of and priority to U.S. application Ser. No. 18/740,760, filed Jun. 12, 2024, a continuation-in-part application that is based on and claims the benefit of and priority to U.S. application Ser. No. 18/621,354, filed Mar. 29, 2024, the disclosures of which are incorporated herein by reference in their entirety for all purposes.

FIELD OF THE INVENTION

The present invention relates generally to the field of fishing. More particularly, the present invention relates to the field of lures.

BACKGROUND

Lures are used by fishing hobbyists and professionals to catch fish. Lures come in a wide variety of shapes, sizes and configurations. Further, lures are versatile in that they can be tailored to attract a particular type of fish by changing one or more characteristics, for example, the shape or size.

Another characteristic that may attract a fish is how well the lure can be seen. One aspect that can make the lure easier for fish to see is reflection of the lure. As the lure moves in the water, the light will reflect off of the lure in different directions. However, if the entire lure, or a significant portion, is reflective, the lure may reflect the light in one direction, which may or may not be in the direction of the fish. Further, reflection of light along the surface of the lure may look less life-like and be less enticing to a fish.

Embodiments of the lure with reflectors are disclosed with reference to the accompanying exemplary drawings, which are for illustrative purposes. It will be understood by those skilled in the art that one or more aspects of this invention can meet certain objectives, while one or more other aspects can lead to certain other objectives. Other objects, features, benefits and advantages of the present invention will be apparent in the summary and descriptions of the disclosed embodiment(s), and will be readily apparent to those skilled in the art. Such objects, features, benefits and advantages will be apparent from that previously described taken in conjunction with the accompanying figures and all reasonable inferences to be drawn therefrom.

DETAILED DESCRIPTION

Figure 1:
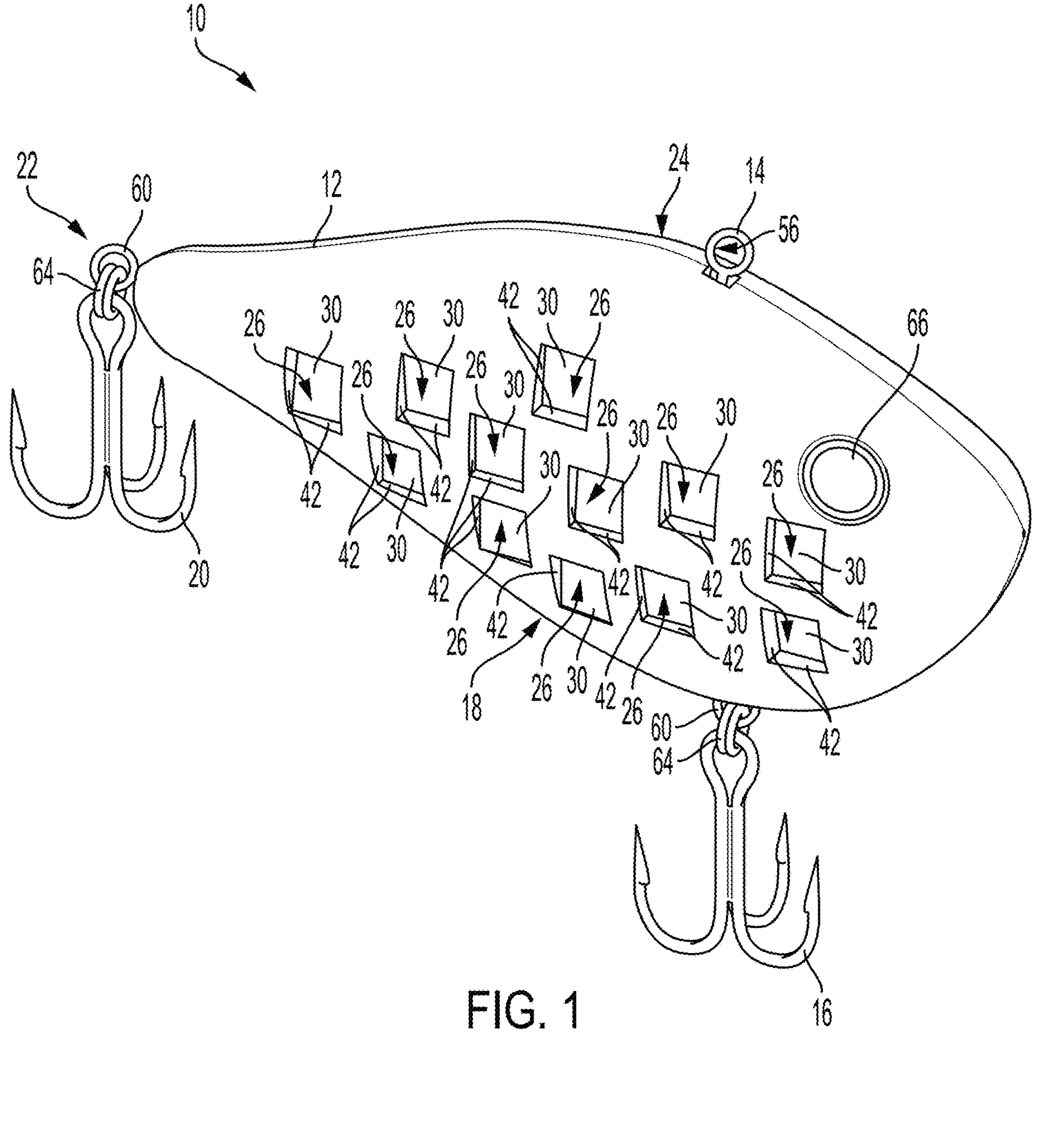
FIG. 1 is a side perspective view of one embodiment of a lure.
Figure 2:
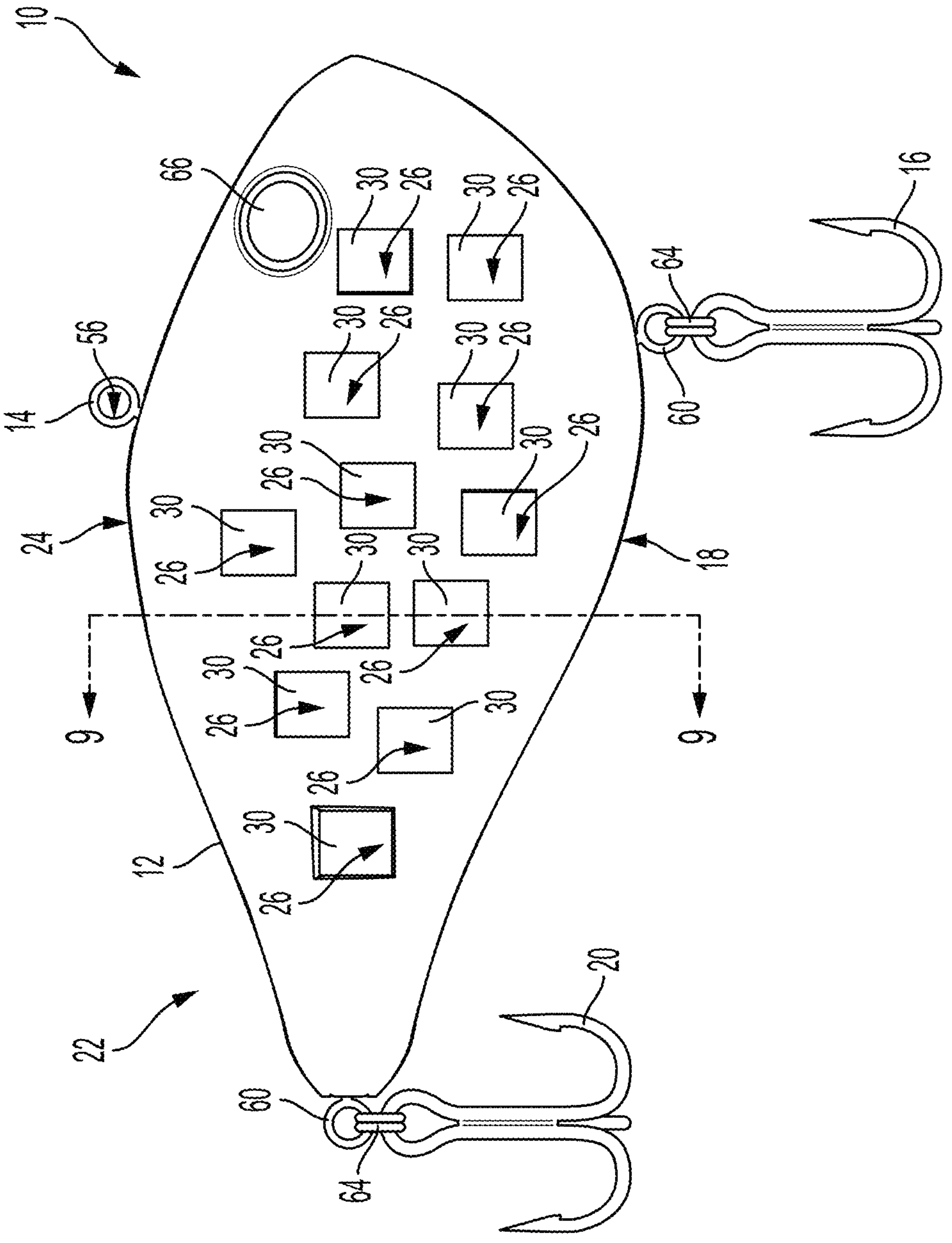
FIG. 2 is a side elevation view of the lure in FIG. 1.
Figure 3:
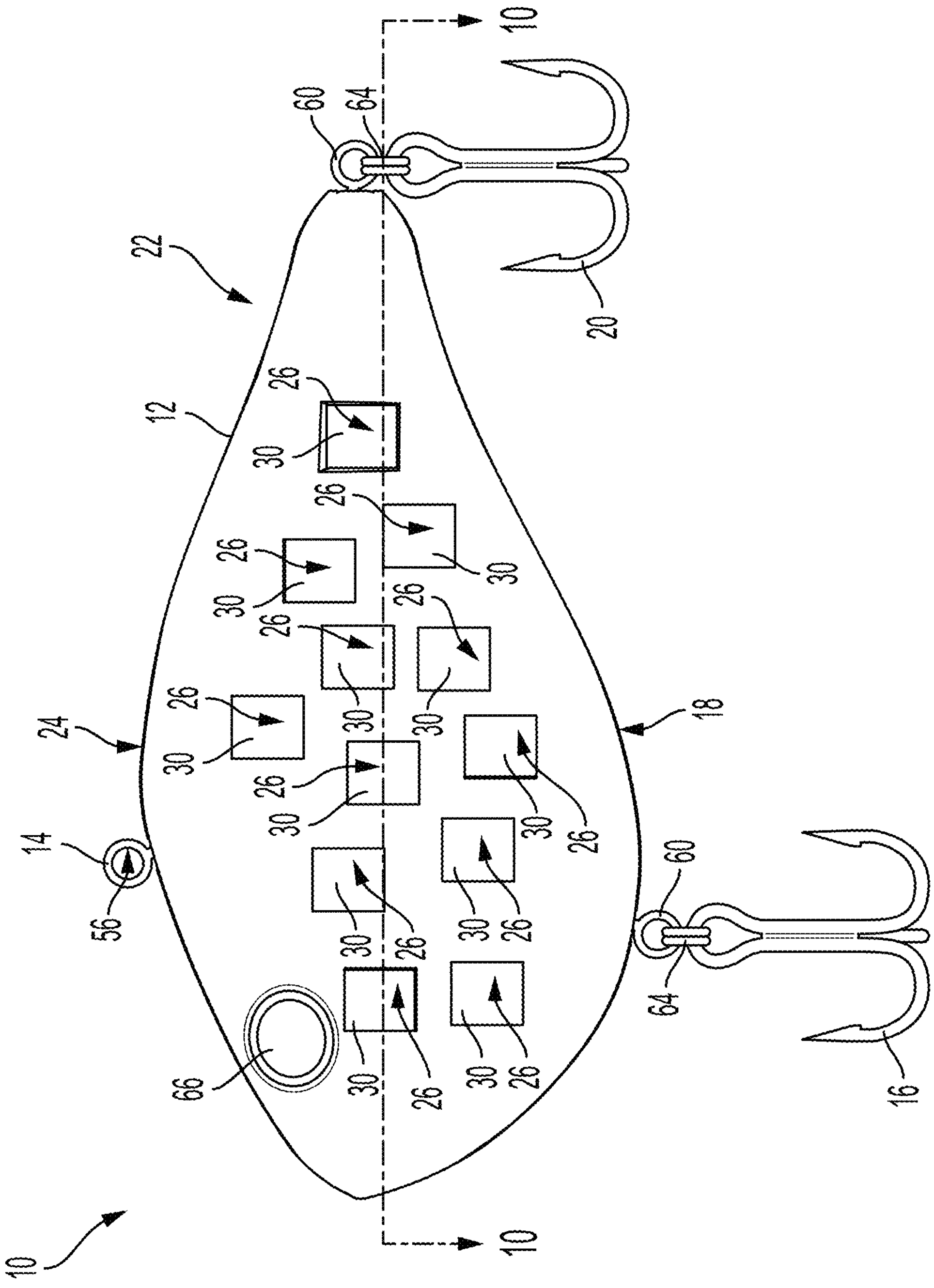
FIG. 3 is a different side elevation view of the lure in FIG. 1.
Figure 4:
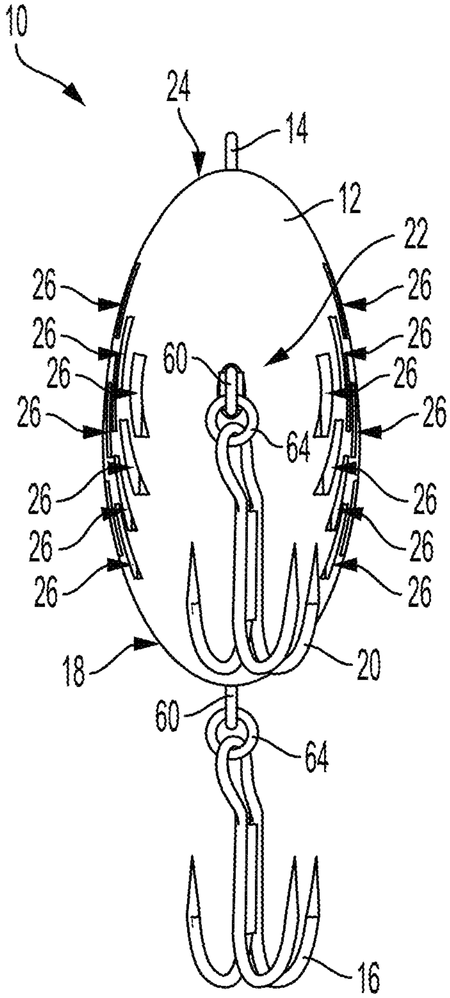
FIG. 4 is a rear elevation view of the lure in FIG. 1.
Figure 5:
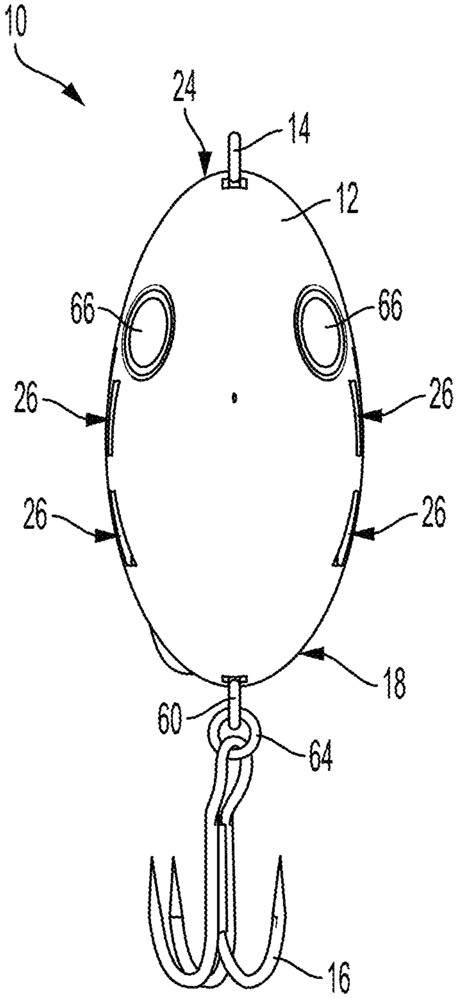
FIG. 5 is a front elevation view of the lure in FIG. 1.
Figure 6:
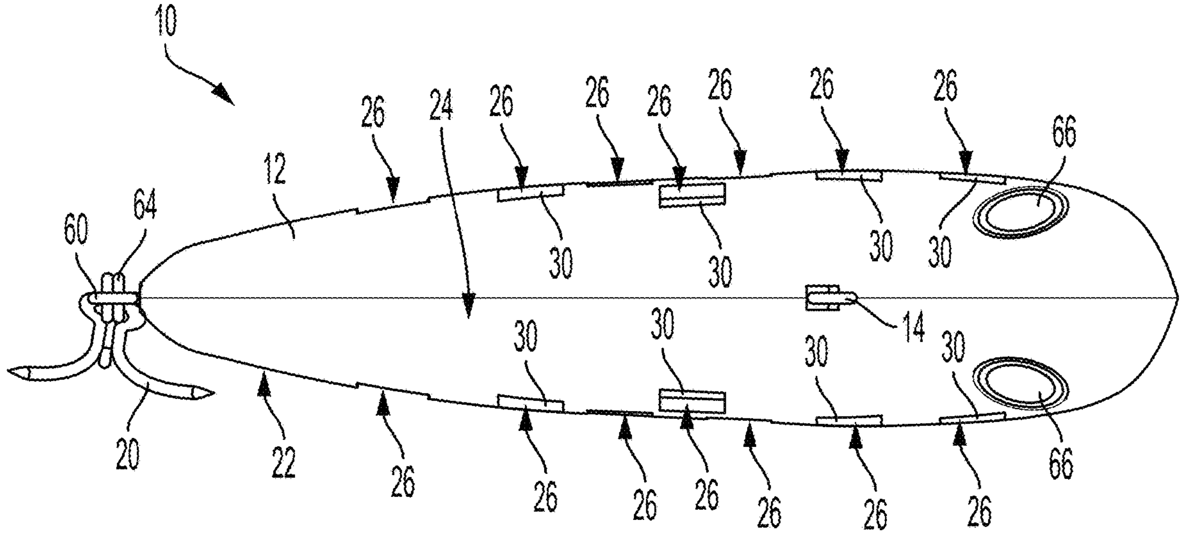
FIG. 6 is a top plan view of the lure in FIG. 1.
Figure 7:
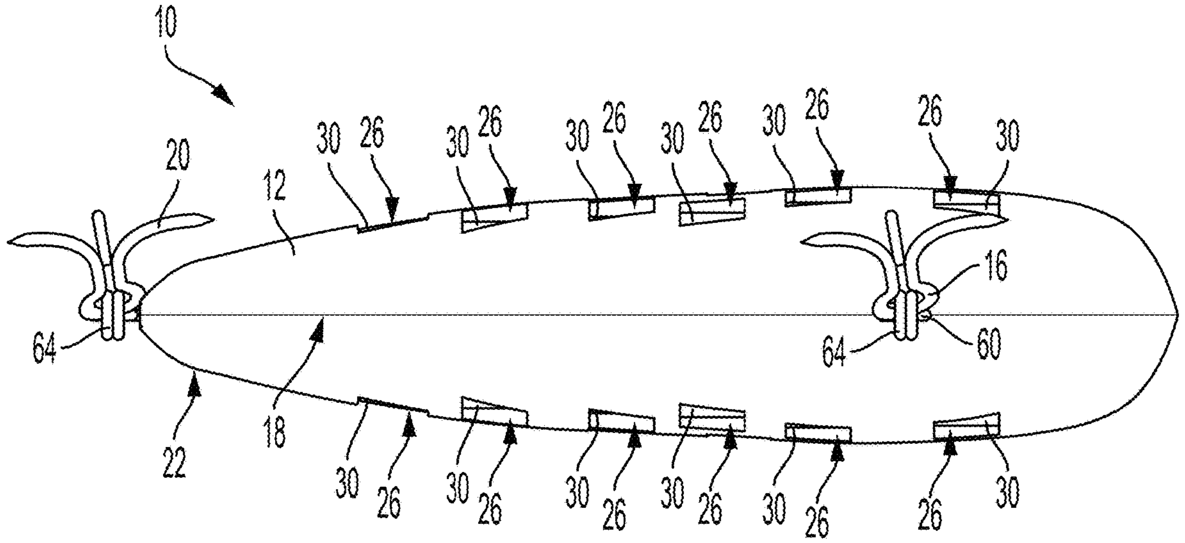
FIG. 7 is a bottom plan view of the lure in FIG. 1.

One embodiment of a lure with reflectors is shown in FIGS. 1-9. As shown in FIG. 1, a lure 10, for example a minnow bait, includes a frame or body 12, one or more hooks and an eyelet or line tie 14 connected or attached to the body. In the embodiment seen in FIG. 1, the hooks include a first or front hook 16 attached to the bottom or under side 18 of the body 12 and a second or rear hook 20 attached to a rear portion 22 of the body. The eyelet 14 can be used to attach the lure 10 to fishing line and, in one embodiment, is attached to a top side 24 of the body 12.

The body 12 can include one or more recesses and/or pockets to accommodate features or accessories and in one embodiment has at least two pockets. For example, as seen in FIG. 1, a series or plurality of pockets 26 can be formed in the body 12. However, other means are known for creating pockets, such as melting, carving, molding, drilling, etc., the use of which would not defeat the spirit of the invention.

In the embodiment seen in FIG. 1, the pockets 26 have a reflective wall. In one embodiment seen in FIG. 9, the reflective wall 26 is formed by attaching a reflective element or material 28 to the back wall 30 of the pockets. In one embodiment, the reflective element 28 is a reflective foil that is attached to the back wall 30, such as by gluing. In another embodiment, a mirror can be attached to the back wall 30. Other materials known in the industry could be used to make the reflective element, for example, stickers, paint, metal, glass, etc., the use of which would not defeat the spirit of the invention.

The pocket 26 could have more than one reflective wall without defeating the spirit of the invention. Further, the reflective wall(s) of the pocket could be or include a side wall. For example, if the lure was a top water lure or bait, it may be desirable to have a wall, such as the top wall, be reflective so as to reflect light down from near the surface of the water into the water below where the fish may be.

The reflective wall of each pocket 26 can be formed, created or set at a certain angle, e.g. up, down, left and/or right. The more angles that the reflective walls are formed, created or set at, the more directions that light will be reflected and the more likely it is that a fish will see the light.

One consideration for setting the angles of the reflective walls can be the movement of the lure. For example, for a lure that moves, wobbles or rotates side to side, such as a top water lure or bait, the back walls 24 might be more varied from the longitudinal axis 32 because the lure itself will cause the back walls to move to different angles away from the vertical axis as it wobbles. For lures that move, wobble or rotate top to bottom, such as a crank bait or lure, the back walls might be more varied from the vertical axis 34 because the lure itself will cause the back walls to move to different angles away from the longitudinal axis as it wobbles.

Figure 11:
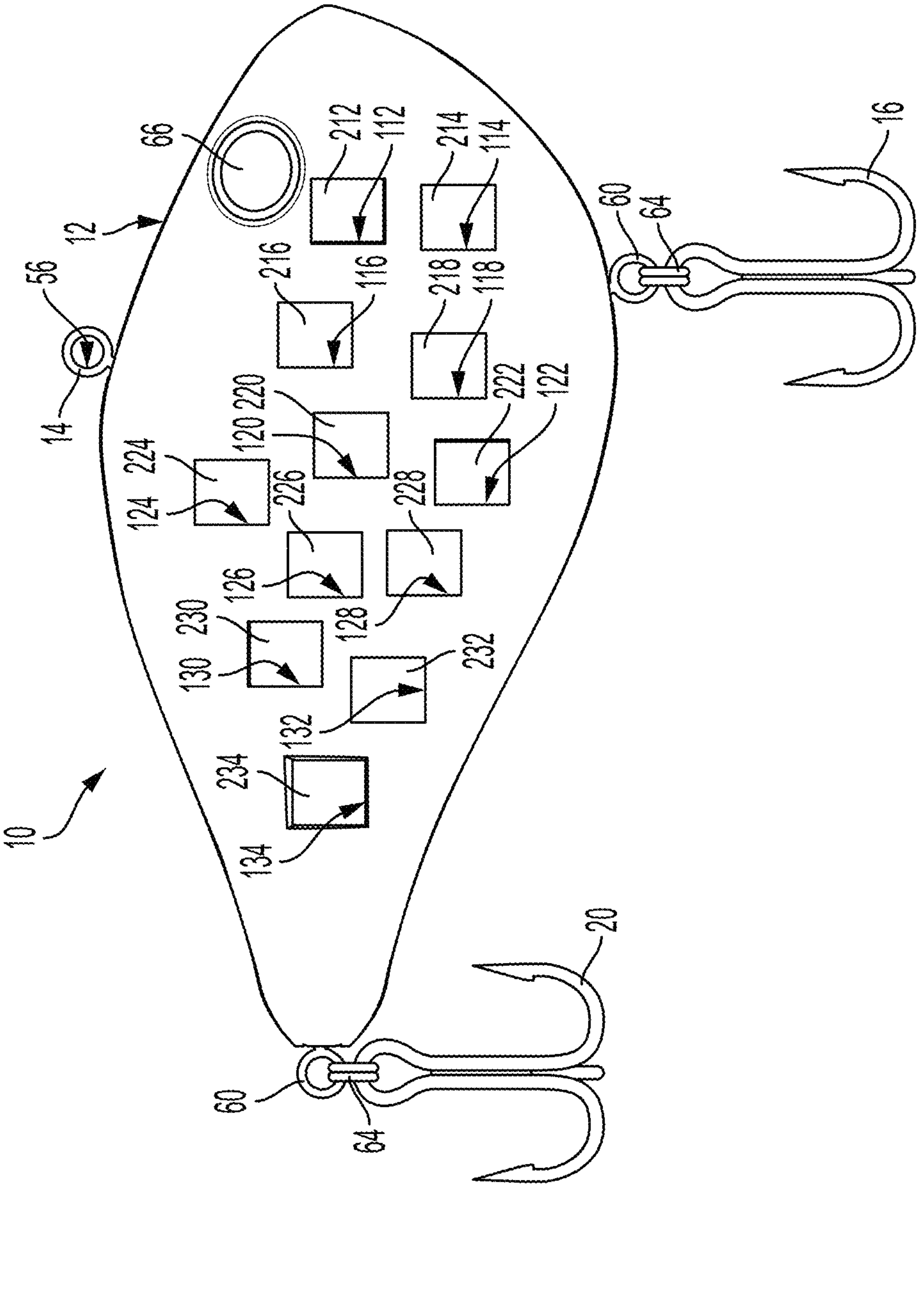
FIG. 11 is a side elevation view of a lure.

In one embodiment, the back wall 30 of each pocket 26 of the plurality of pockets on one side is at a compound angle, e.g. an angle from the longitudinal axis 32 and an angle from the vertical axis 34. In other words the cartesian plane of one back wall 30 is different than the cartesian plane of the other back walls. This configuration reflects the light in a large number of directions, which increases the chance of a fish seeing the reflection. In the embodiment seen in FIG. 11, the pockets are individually identified 112-134 as are the corresponding back walls 212-234 of such pockets.

Figure 12:
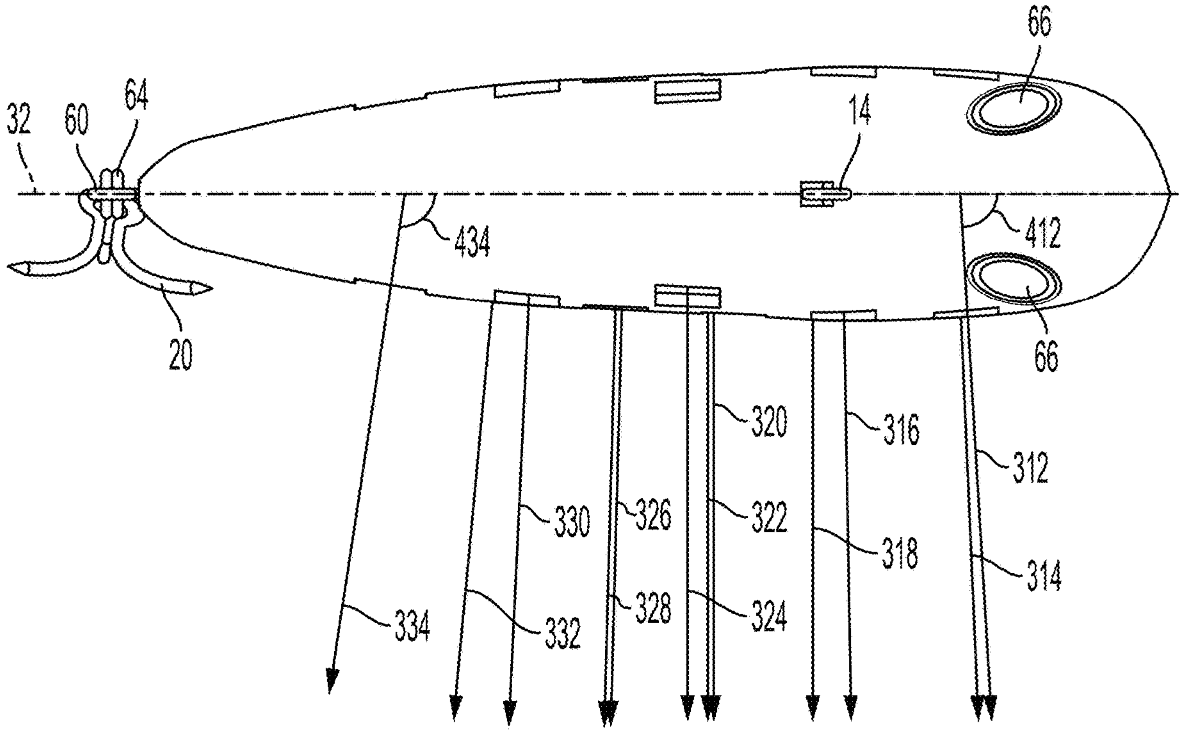
FIG. 12 is a top plan view of the lure in FIG. 11.

FIG. 12 depicts arrows 312-334 illustrating the direction each back wall 212-234 reflects light in comparison to the longitudinal axis 32. The first angles are the angles the arrows 312-334 are away from the longitudinal axis 32. For example, direction 312 corresponds to the direction back wall 212 of pocket 112 will reflect light. Direction 312 is at a first angle 412 (86°) away from the longitudinal axis 32. Direction 334 corresponds to the direction back wall 234 of pocket 134 will reflect light. Direction 334 is at a first angle 434 (99°) away from the longitudinal axis 32. First angle 434 is greater than first angle 412.

Figure 13:
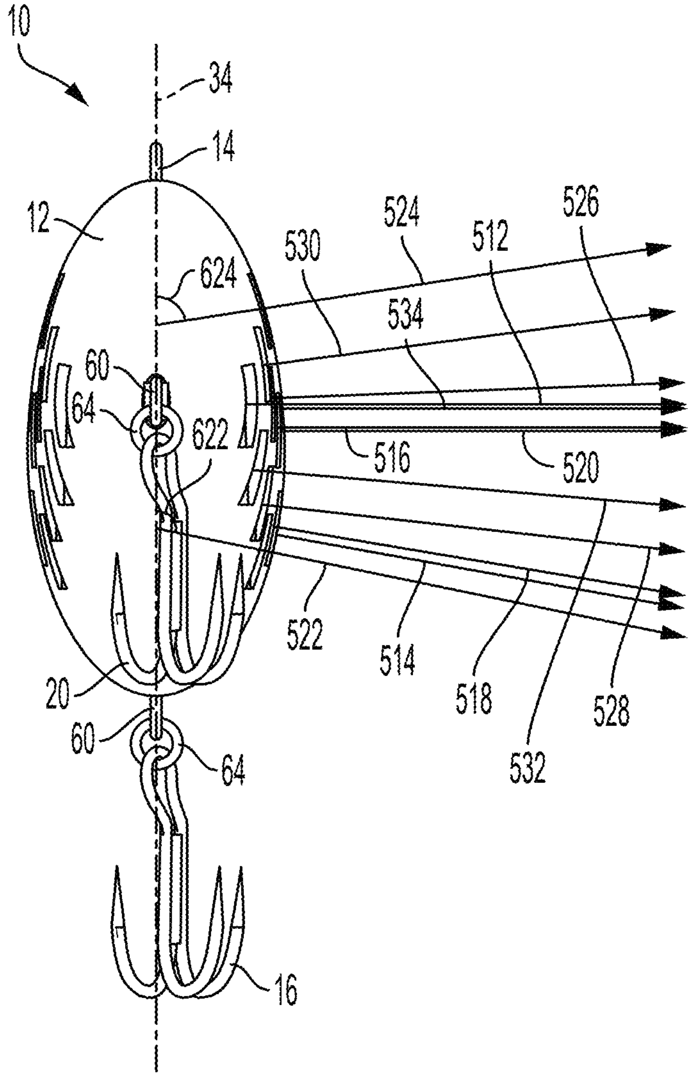
FIG. 13 is a rear elevation view of the lure in FIG. 11.

FIG. 13 depicts arrows 512-532 illustrating the direction each back wall 212-234 reflects light in comparison to the vertical axis 34. The second angles are the angles the arrows 512-532 are away from the vertical axis 32. For example, direction 522 corresponds to the direction back wall 222 of pocket 122 will reflect light. Direction 522 is a second angle 622 (102°) away from the vertical axis 34. Direction 524 corresponds to the direction back wall 224 of pocket 124 will reflect light. Direction 524 is a second angle 624 (81°) away from the vertical axis 34. Second angle 622 is greater than second angle 624.

| Pocket | Back Wall | First Direction | First Angle | Second Direction | Second Angle |
|---|---|---|---|---|---|
| 112 | 212 | 312 | 86° | 512 | 90° |
| 114 | 214 | 314 | 88° | 514 | 101° |
| 116 | 216 | 316 | 89° | 516 | 90° |
| 118 | 218 | 318 | 90° | 518 | 101° |
| 120 | 220 | 320 | 90° | 520 | 90° |
| 122 | 222 | 322 | 90° | 522 | 102° |
| 124 | 224 | 324 | 90° | 524 | 81° |
| 126 | 226 | 326 | 92° | 526 | 87° |
| 128 | 228 | 328 | 92° | 528 | 97° |
| 130 | 230 | 330 | 93° | 530 | 83° |
| 132 | 232 | 332 | 96° | 532 | 96° |
| 134 | 234 | 334 | 99° | 534 | 90° |

As the lure 10 is pulled through water by a fisherman or woman, such as, for example, by a line tied to the line tie 14 and the line being reeled, the lure will move, e.g. wobble side to side and/or front to back. As the lure 10 moves, light will hit and reflect from one or more reflective back walls 30. As lure 10 moves more, the light will stop hitting the one or more reflective back walls 30 and hit and reflect from one or more other reflective back walls 30. The process will repeat itself as the lure 10 is pulled through the water. Light reflecting off of one or more reflective back walls 30, stopping and then reflecting off of one or more other reflective back walls 30 will make the lure to blink, flash or have a disco ball effect.

Alternatively or additionally, a first back wall 24 may reflect light in a first direction when the lure 10 is in a first position or orientation. When the lure 10 changes or moves to a different or second orientation or position, the first back wall 30 may reflect light in a second direction and a second back wall may reflect light in the first direction.

The lure 10 may also be pulled through areas of light, such as, for example, open water, and areas of low or no light, such as in the shadow of a rock or tree. As the lure 10 is pulled through areas of light and dark, the one or more reflective back walls 30 will reflect the light, when in the light, and stop, when not in the light, also causing the lure look like it is blinking or flashing.

When the lure is in a first position, a first pocket may reflect light in a first direction, and when the lure is in a second position, a second pocket reflects light in the first direction and the first pocket reflects light in a different direction.

Figure 14:
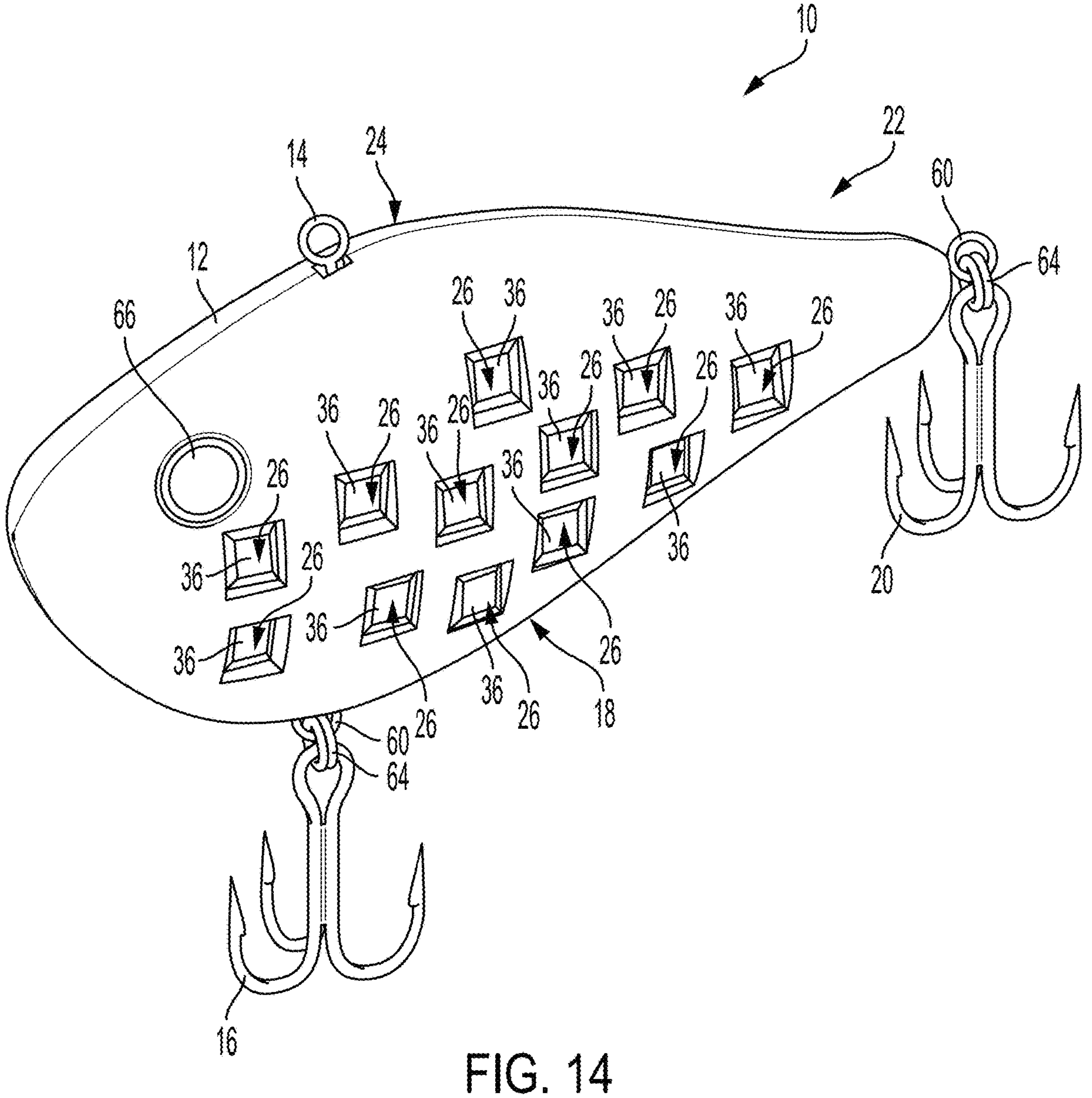
FIG. 14 is a side perspective view of a lure.
Figure 15:
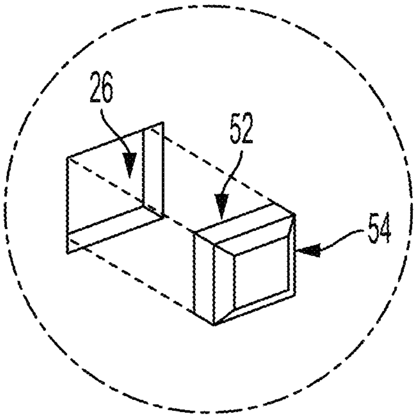
FIG. 15 is an exploded embodiment of a sticker and pocket of the lure of FIG. 14.

In another embodiment seen in FIGS. 14-15, a three-dimensional epoxy resin sticker 36 may be used. The sticker 36 has a reflective base 38 and a rounded top 40. The stickers 36 help the light reflect in even more directions and gives the lure 10 more perception of depth. A multifaceted reflective material could also be used, e.g. a three dimensional gem shaped sticker. The many facets would promote the light to reflect in many directions.

The use of pockets 26 or recesses in the body 12 of the lure 10 also helps give the lure a more life-like appearance in that it gives the lure depth. As can be seen in one embodiment best seen in FIG. 1, some or all of the pockets 26 may be recessed away from the exterior contour of the body 12 at different distances or depths.

Figure 9:
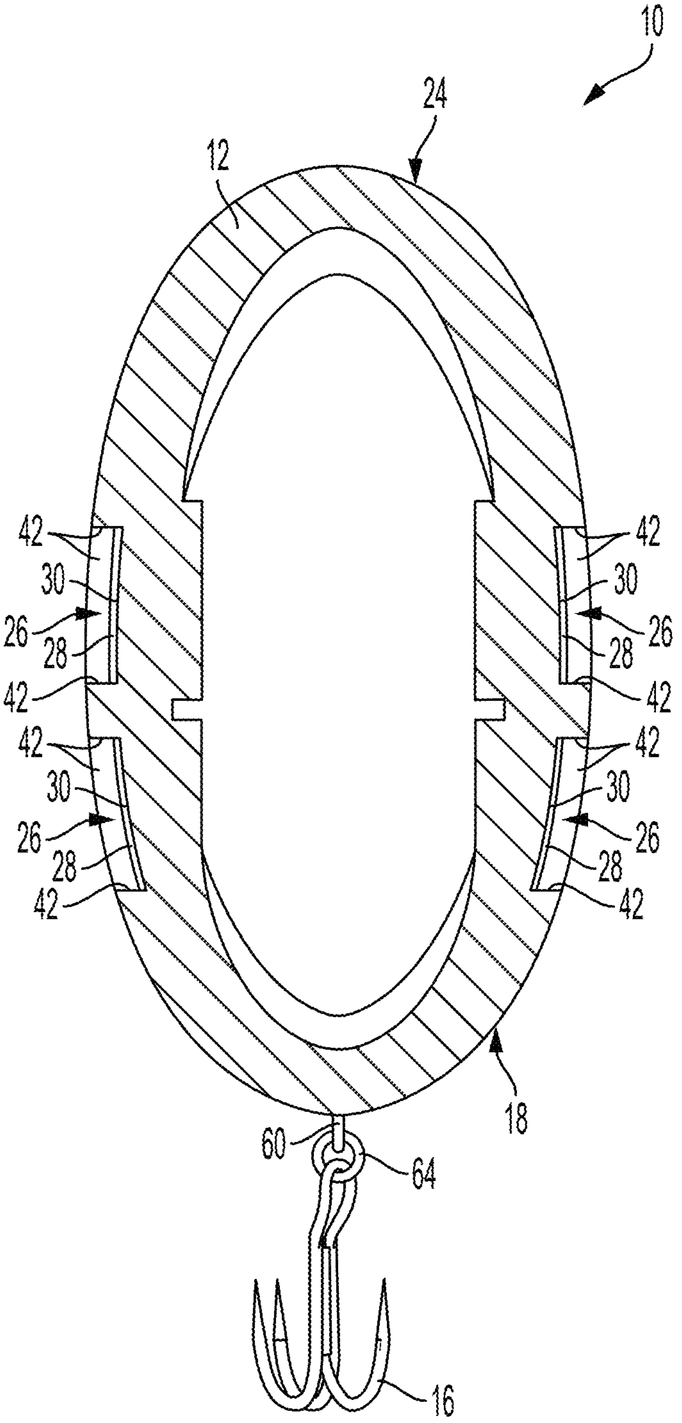
FIG. 9 is a cross-sectional view of the lure of FIG. 2 taken from the line 9-9.
Figure 10:
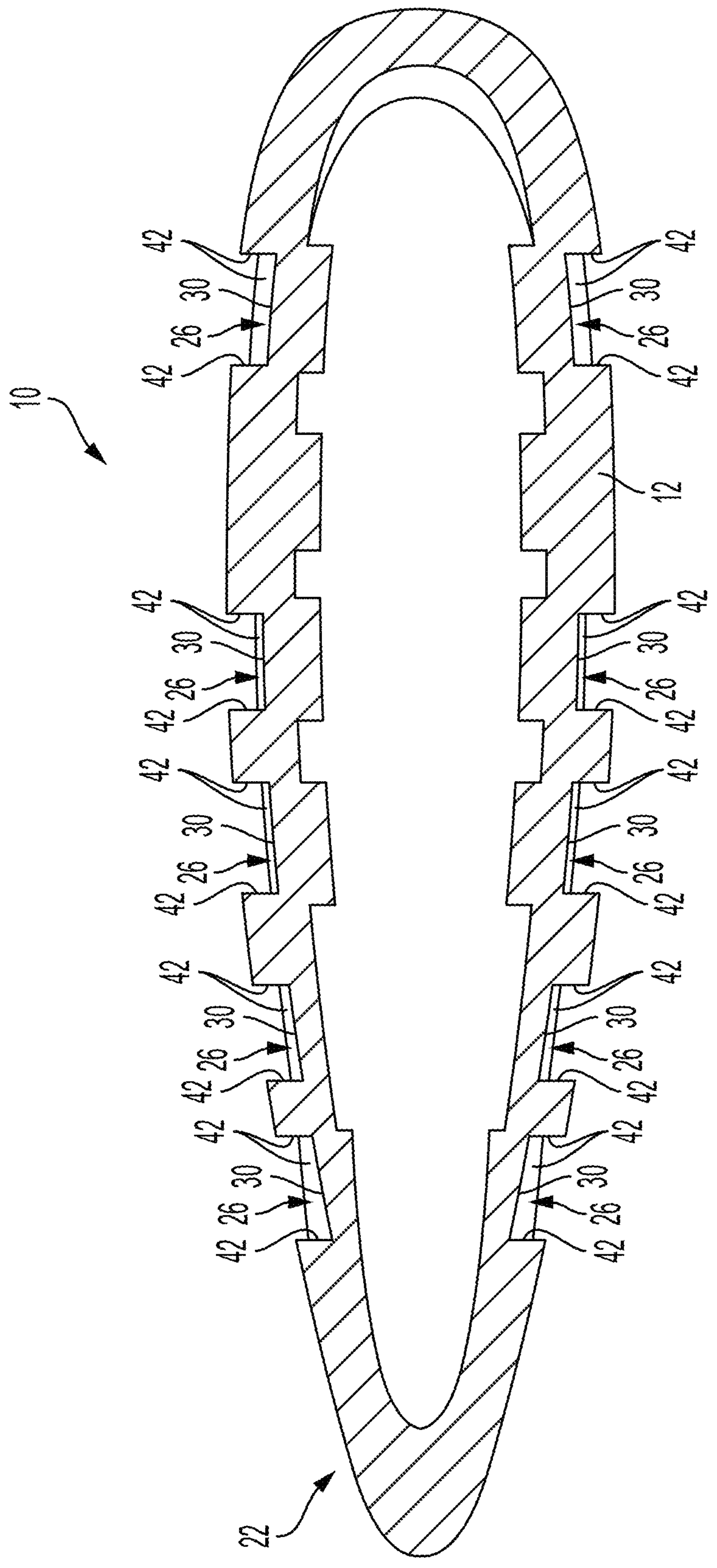
FIG. 10 is a cross-sectional view of the lure of FIG. 3 taken from the line 10-10.

Even when the one or more reflective back walls 24 are reflecting light, the side walls 42 (as seen in FIGS. 1 and 9-10) of the pocket 26 may narrow or prevent all together the light being reflected towards the fish. This may increase the blinking or flashing effect of the lure 10 even further. Locating the reflective material in pockets also prevents the reflective material from being damaged such as from a fish bite or from rubbing against things in the water such as rocks or fishing equipment in a tackle box.

Figure 8:
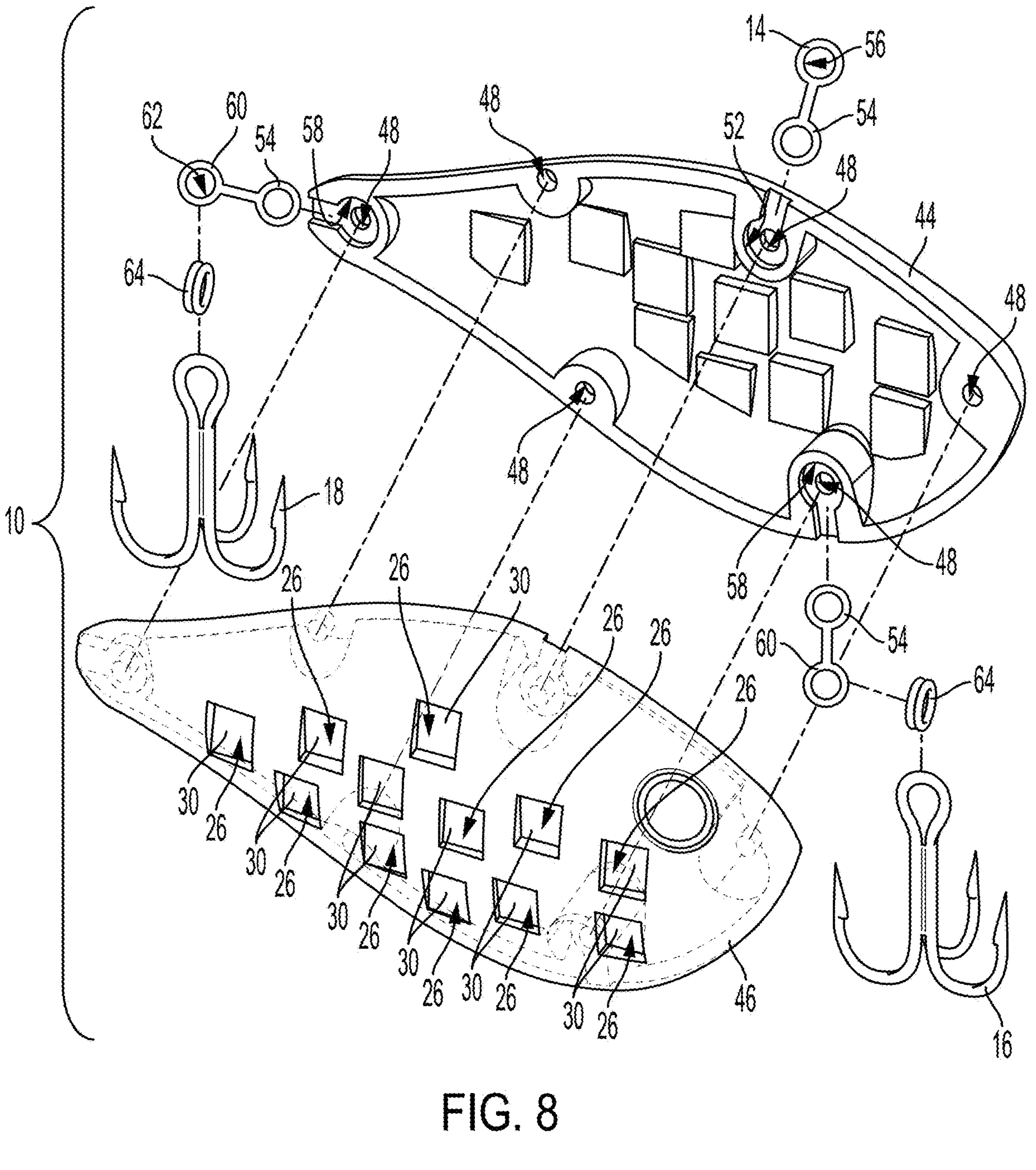
FIG. 8 is an exploded perspective view of one embodiment of a lure.

In one embodiment, best seen in FIG. 8, the body 12 is formed by combing two portions, a first body portion 44 and a second body portion 46. In one embodiment, the first body portion 44 and second body portion 46 can be formed from acrylonitrile butadiene styrene, which provides the advantages of its strength, durability and compatibility with a wide range of manufacturing processes. However, other materials known in the industry could be used, for example, other plastics, rubber, silicon, etc., the use of which would not defeat the spirit of the invention.

In one embodiment, the first body portion 44 has one more holes 48 formed therein that are configured to receive one or more posts 50 from the second body portion 46. The first body portion 44 can be secured to the second body 46 such as by adhesive. However, other means for attaching are known in the industry, e.g. screws, friction fitting, snap fitting, tongue, and groove, etc., the use of which would not defeat the spirit of the invention.

The lure 10 can have pockets on both sides of the body 12. For example, the lure 10 could have at least two pockets or a first plurality of pockets on a first side of the body 12 and at least two additional pockets or a second plurality of pockets on a second side of the body. In the embodiment seen in FIGS. 2-3, the number, orientation, and angles of the pockets and reflectors on a first side of the body 12 or first body portion 44 can be the same as the or a mirrored version of the number, orientation, and angles of the pockets and reflectors on a second side of the body or second body portion 46. In other words, the first body portion 44 and second body portion can be enantiomorphs or reversed images of each other.

In some embodiments it is desired to coat the lure 10 with a paint, epoxy, enamel, or other coating. Coating the lure 10 can also increase the strength and longevity of the lure. Further, some fish can see and are attracted to colors more than others.

In one embodiment, the first body portion 44 may have a cavity 52 formed therein to receive the line tie 14. In the embodiment seen in FIG. 8, a first end of the line tie may have an opening 54 such that fishing line may be attached to the line tie through the opening. The line tie 14 may have a second end with a second opening 56 configured such that one of the posts 50 from the second side portion 46 holds the line tie in position when the hole 48 receives the post 50. The cavity 52 may be formed in either or both of the first side portion 44 and/or the second side portion 46 without defeating the spirit of the invention. Further, other methods are known for attaching a line tie to a body such as be threading, adhering, etc., the use of which would not defeat the spirit of the invention.

In one embodiment, the first body portion 44 may have a second cavity 58 formed therein to receive a hook tie 60. In the embodiment seen in FIG. 8, a first end of the hook tie 60 may have an opening 62 configured such that one of the posts 50 from the second side portion 46 holds the hook loop in position when the hole 48 receives the post 50. The hook 20 may be attached to the hook tie 60 using a split ring 64. The cavity 58 may be formed in either or both of the first side portion 44 and/or the second side portion 46 without defeating the spirit of the invention. In the embodiment seen in FIG. 8, both hooks 20 are attached to the body 12 by hook ties 60 and split rings 64. However, other methods are known for attaching a hook tie to a body such as be threading, adhering, etc. or the hook 16 could be directly attached to the body 12, without defeating the spirit of the invention.

The exterior surface of the body or portions could include features to make the lure or jig look like the live bait it is attempting to mimic. For example, the front of the body could include an eye 66, although other features could be used, for example, texturing of the body to resemble scales or reflect light, fins, mouth, legs, etc., painting, epoxying, etc., without defeating the spirit of the invention. In some cases, such features could be molded in the body or added thereto.

Figure 16:
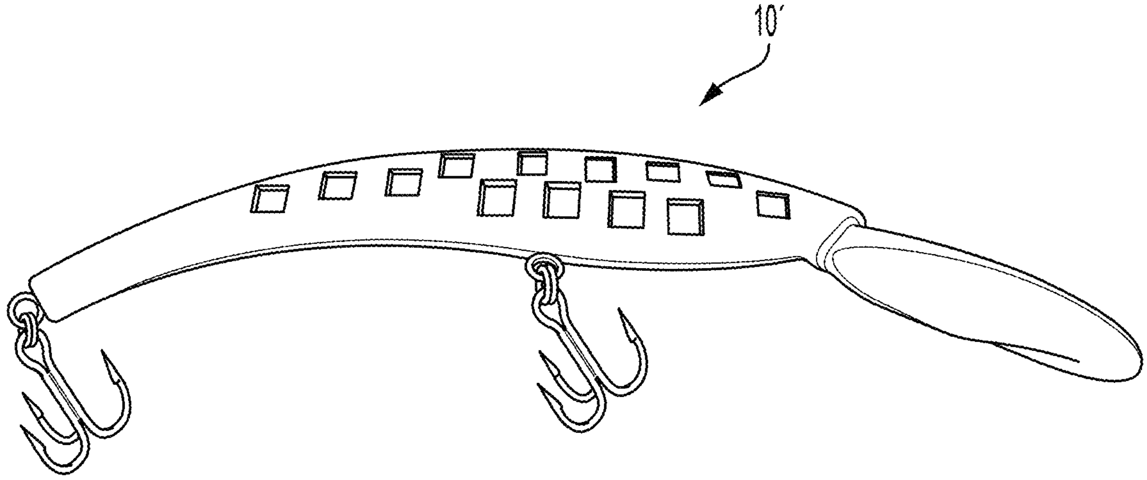
FIG. 16 is a side perspective view of a lure.
Figure 17:
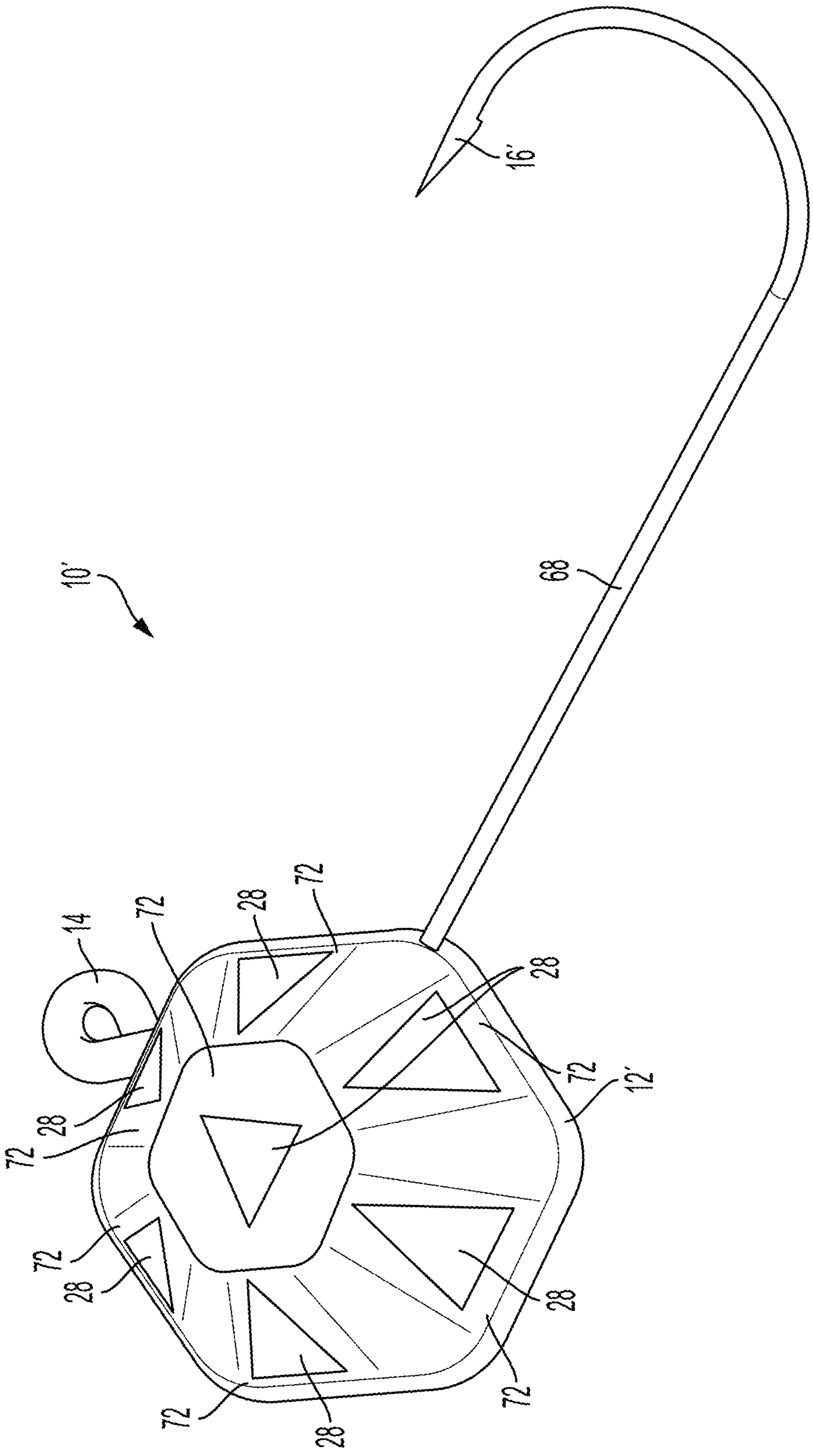
FIG. 17 is a side perspective view of an embodiment of a lure.
Figure 18:
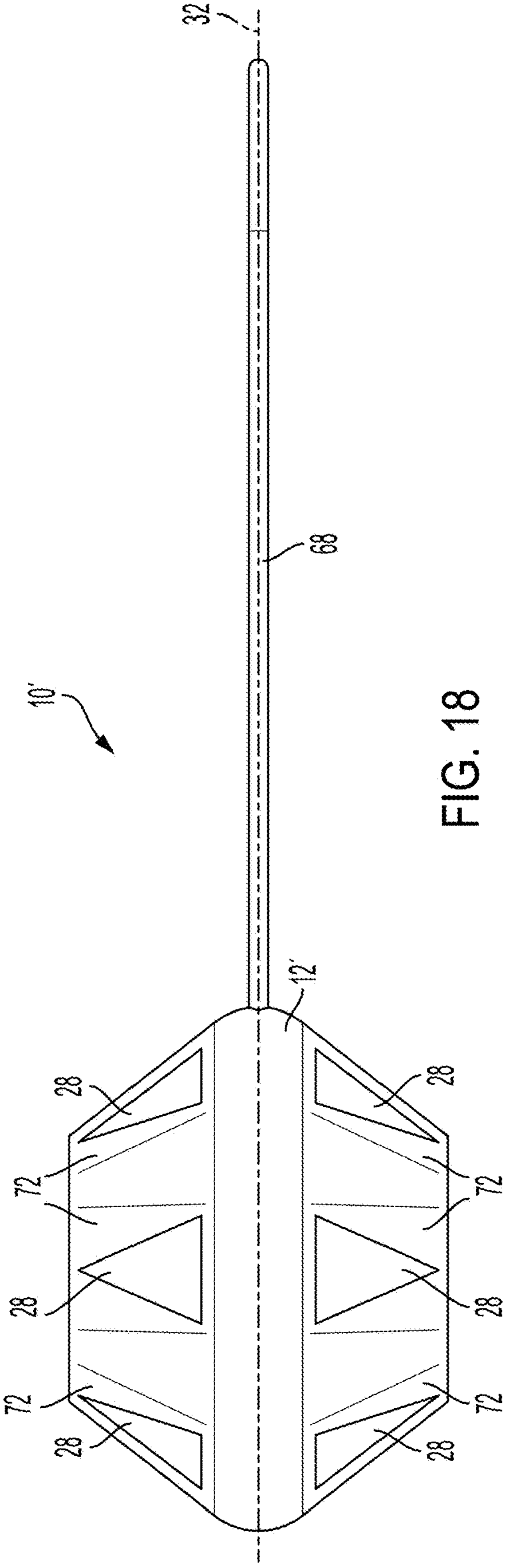
FIG. 18 is a bottom plan view of the lure in FIG. 17.
Figure 19:
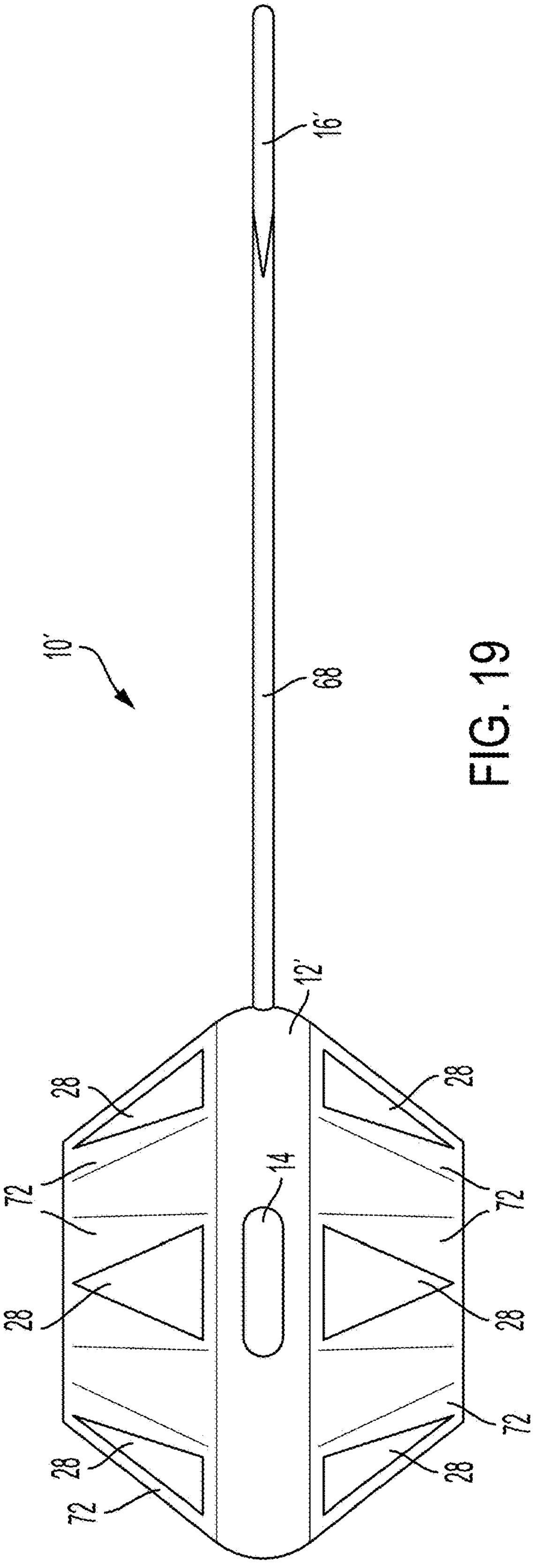
FIG. 19 is a top plan view of the lure in FIG. 17.
Figure 21:
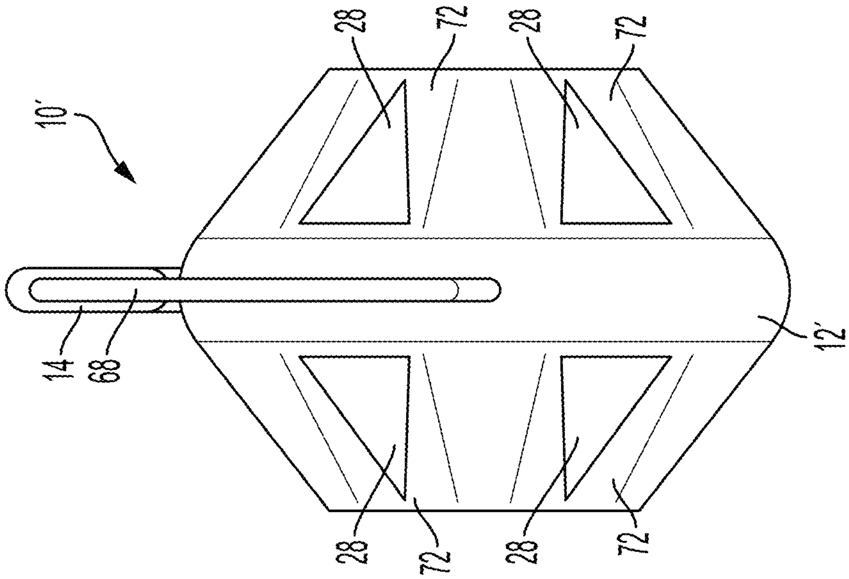
FIG. 21 is a rear elevation view of the lure in FIG. 17.
Figure 20:
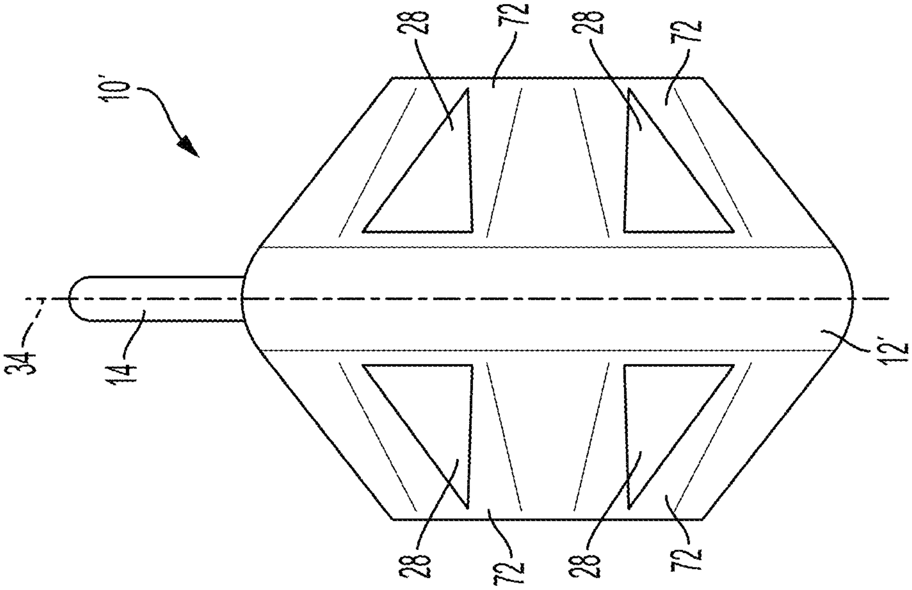
FIG. 20 is a front elevation view of the lure in FIG. 17.
Figure 22:
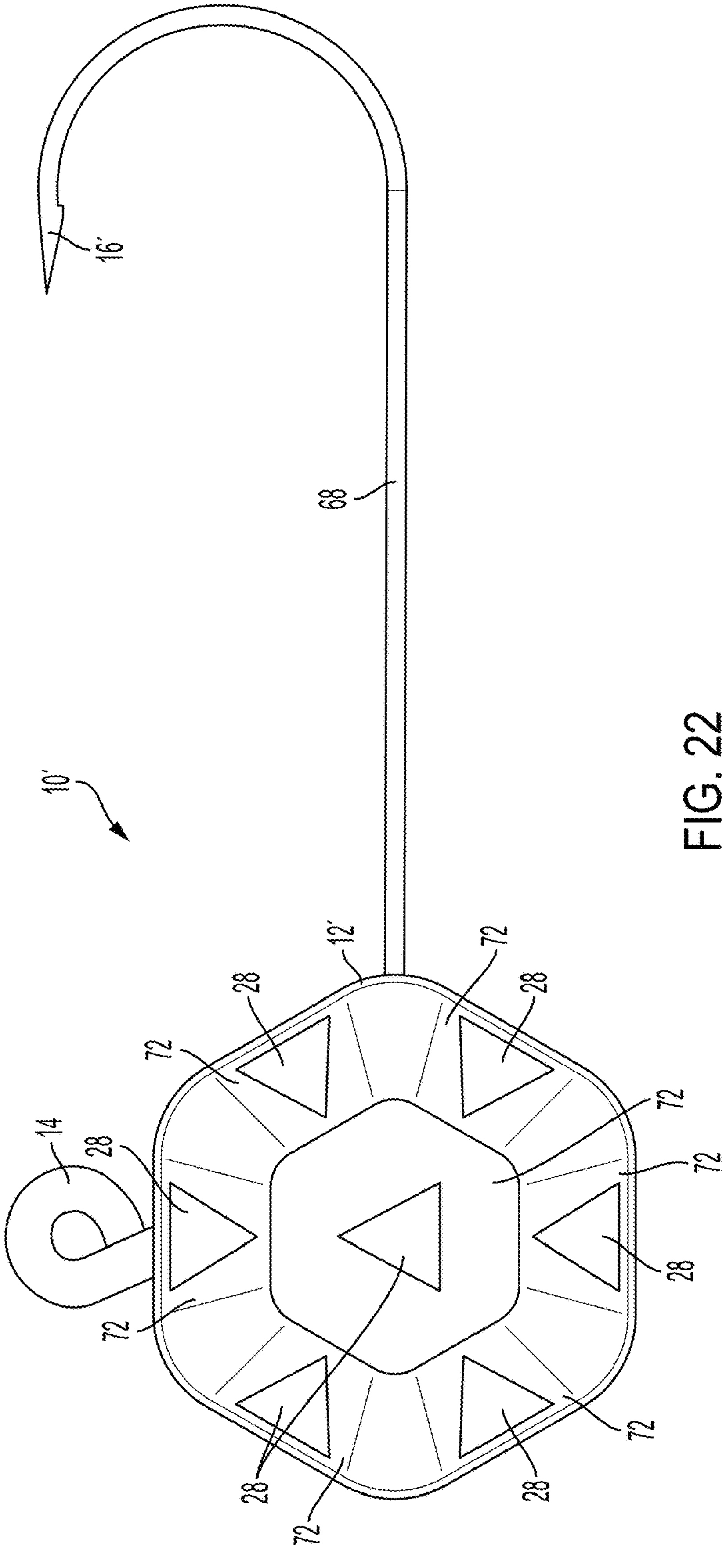
FIG. 22 is a side elevation view of the lure in FIG. 17.
Figure 23:
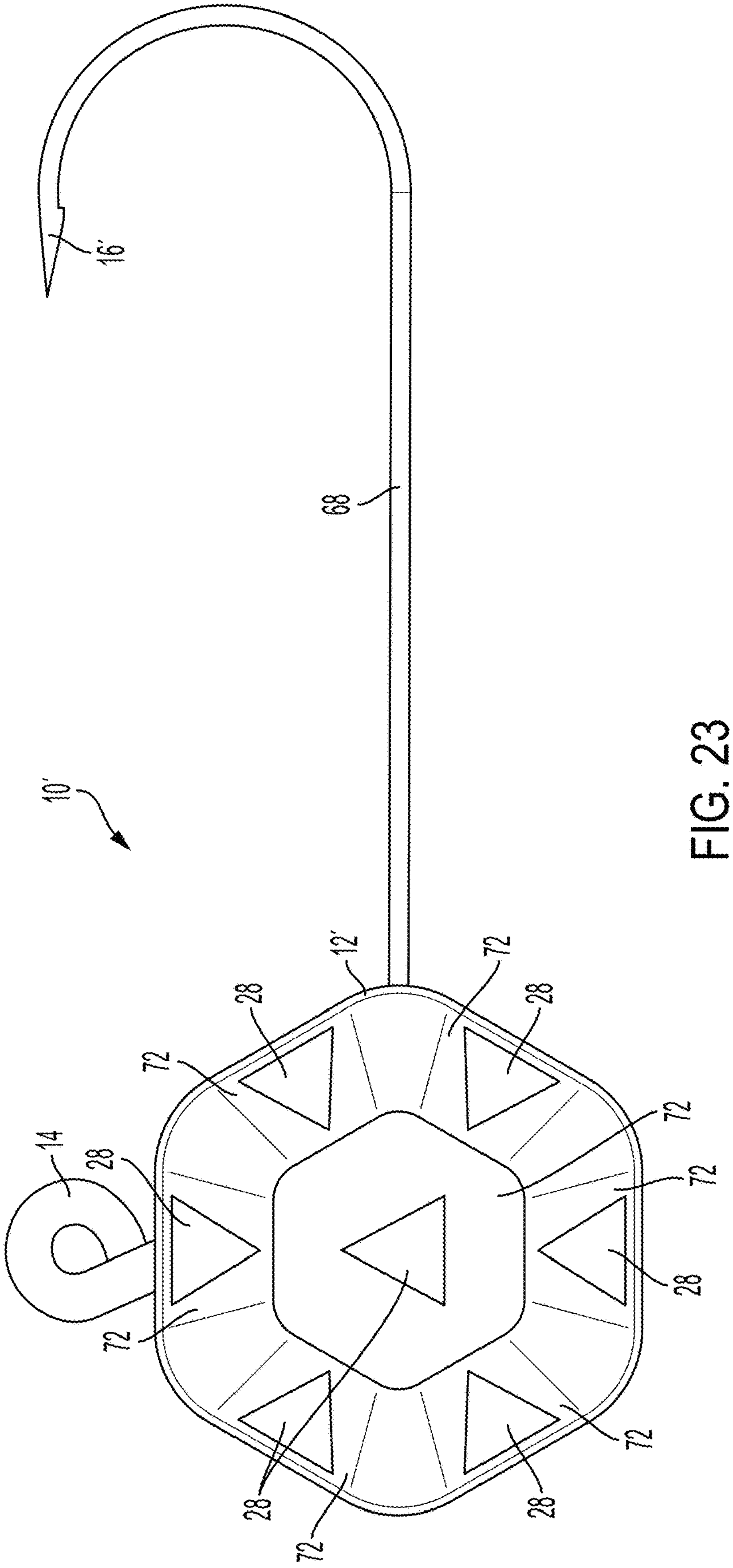
FIG. 23 is a different side elevation view of the lure in FIG. 17.
Figure 24:
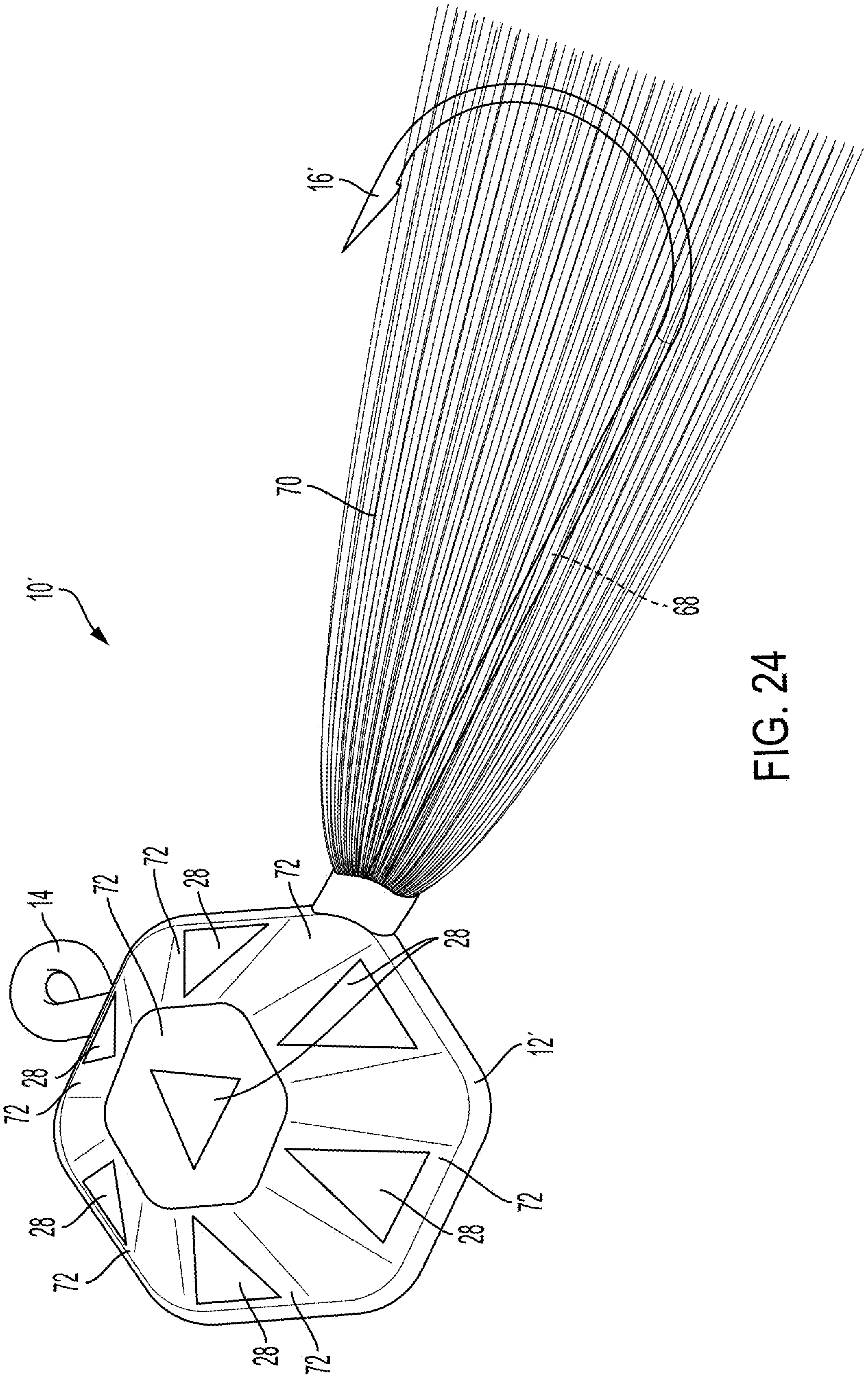
FIG. 24 is a side perspective view of an embodiment of a lure.
Figure 25:
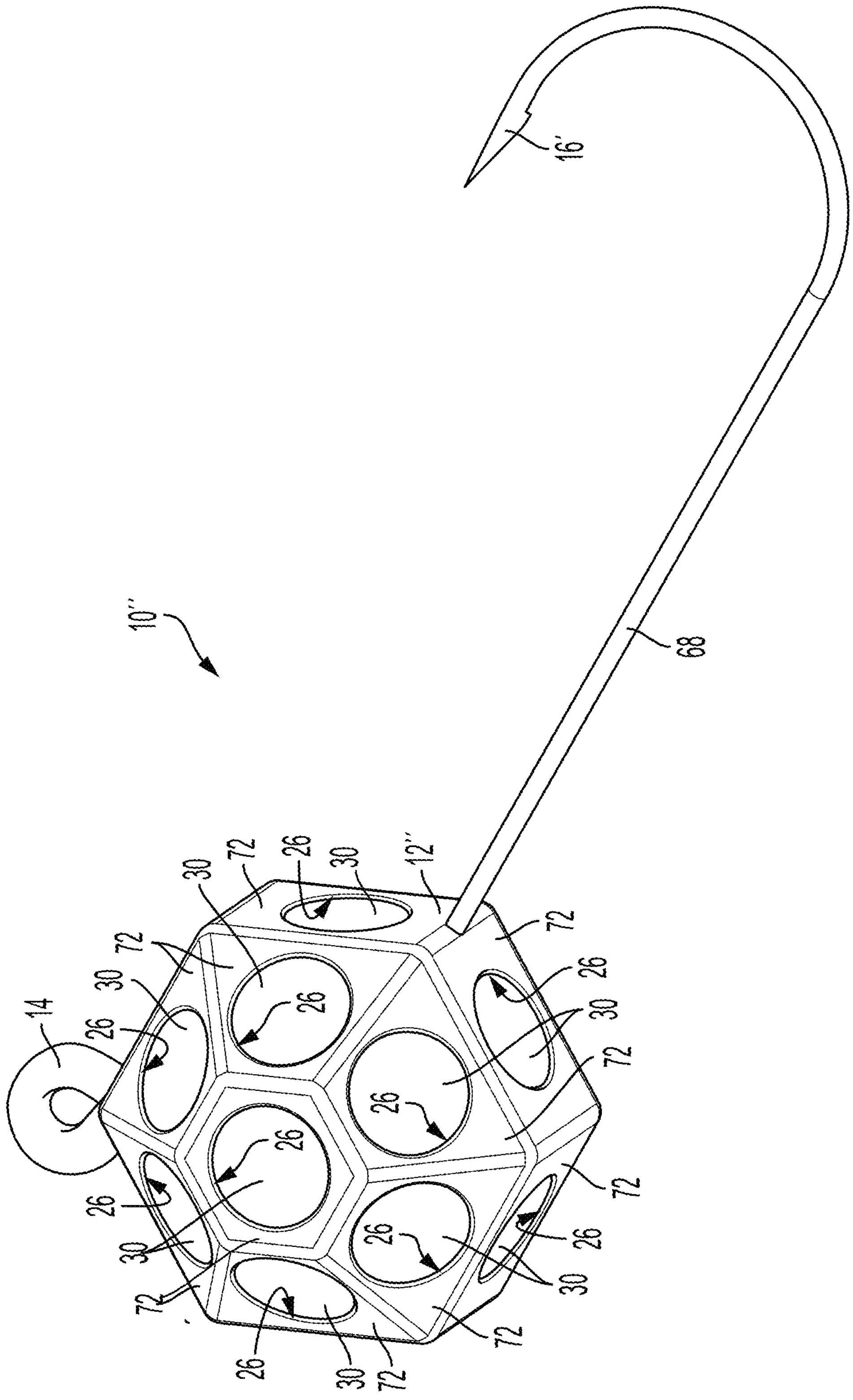
FIG. 25 is a side perspective view of an embodiment of a lure.

The use of pockets 26 with reflectors can be used with other styles and shapes of lures or baits. For example, in the embodiment seen in FIG. 16, the lure 10 is a crank bait. However, pockets could be applied to other lures or baits known in the industry without defeating the spirit of the invention.

Figure 26:
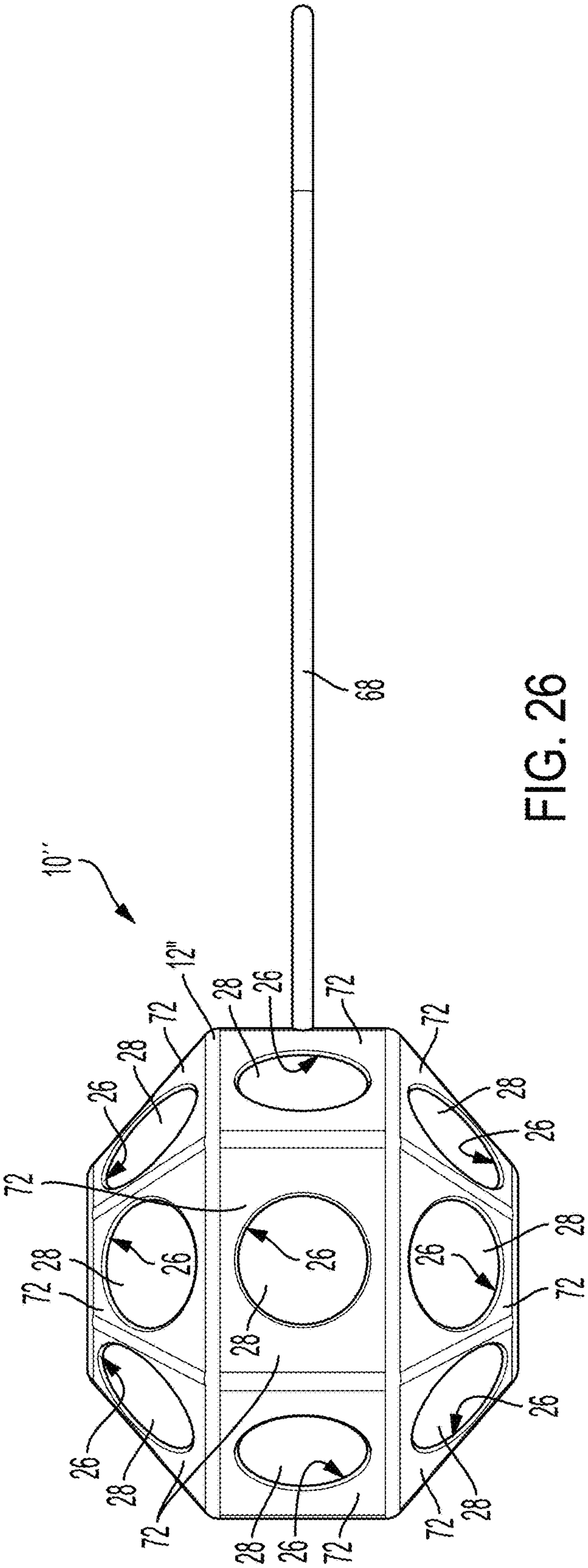
FIG. 26 is a bottom plan view of the lure in FIG. 25.
Figure 27:
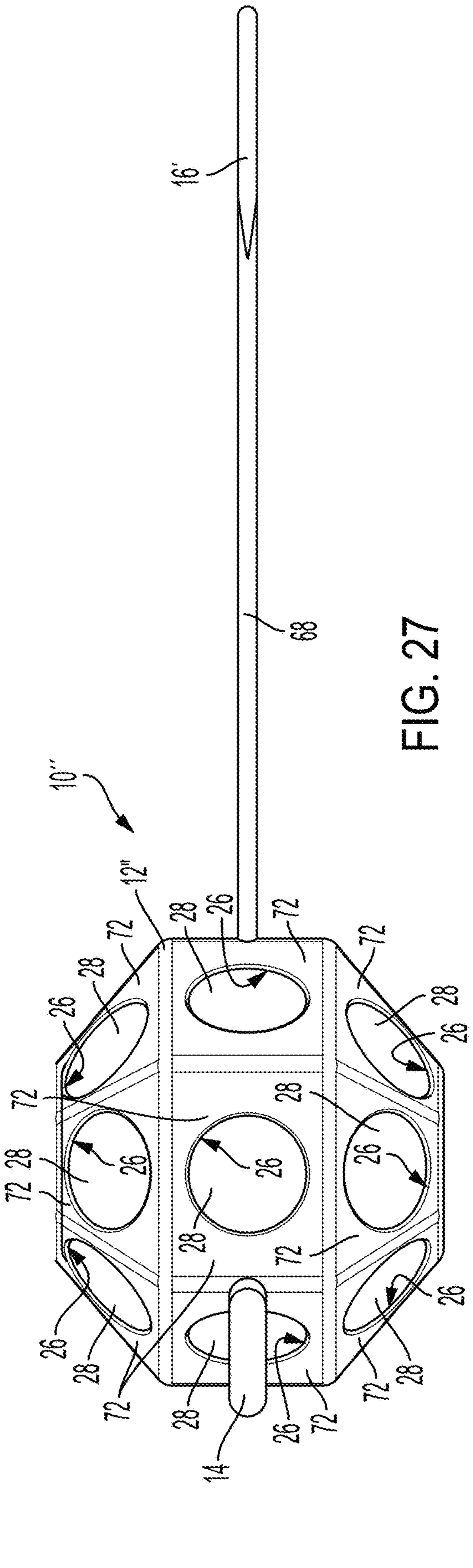
FIG. 27 is a top plan view of the lure in FIG. 25.
Figure 29:
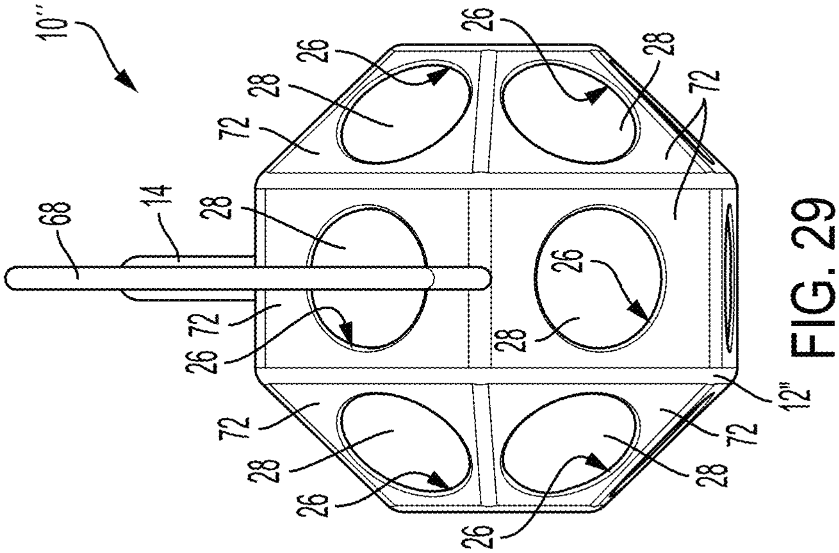
FIG. 29 is a rear elevation view of the lure in FIG. 25.
Figure 28:
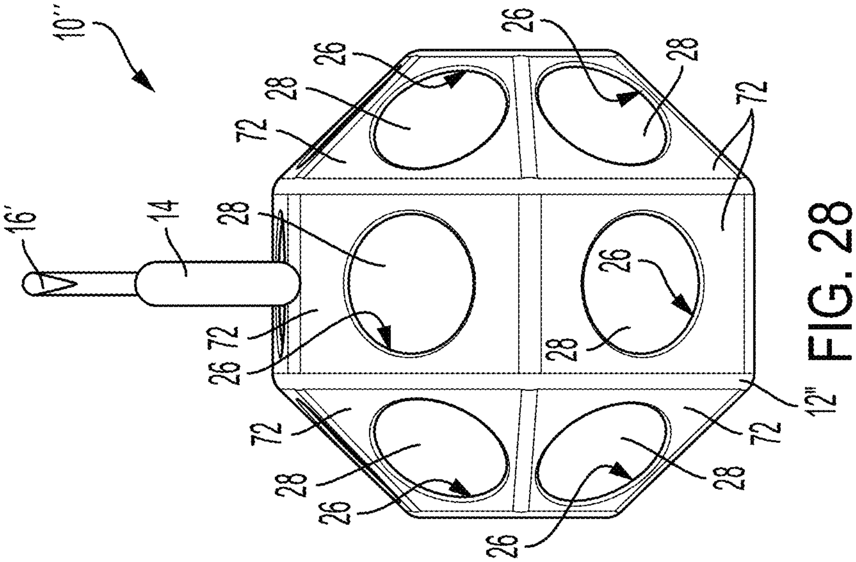
FIG. 28 is a front elevation view of the lure in FIG. 25.
Figure 30:
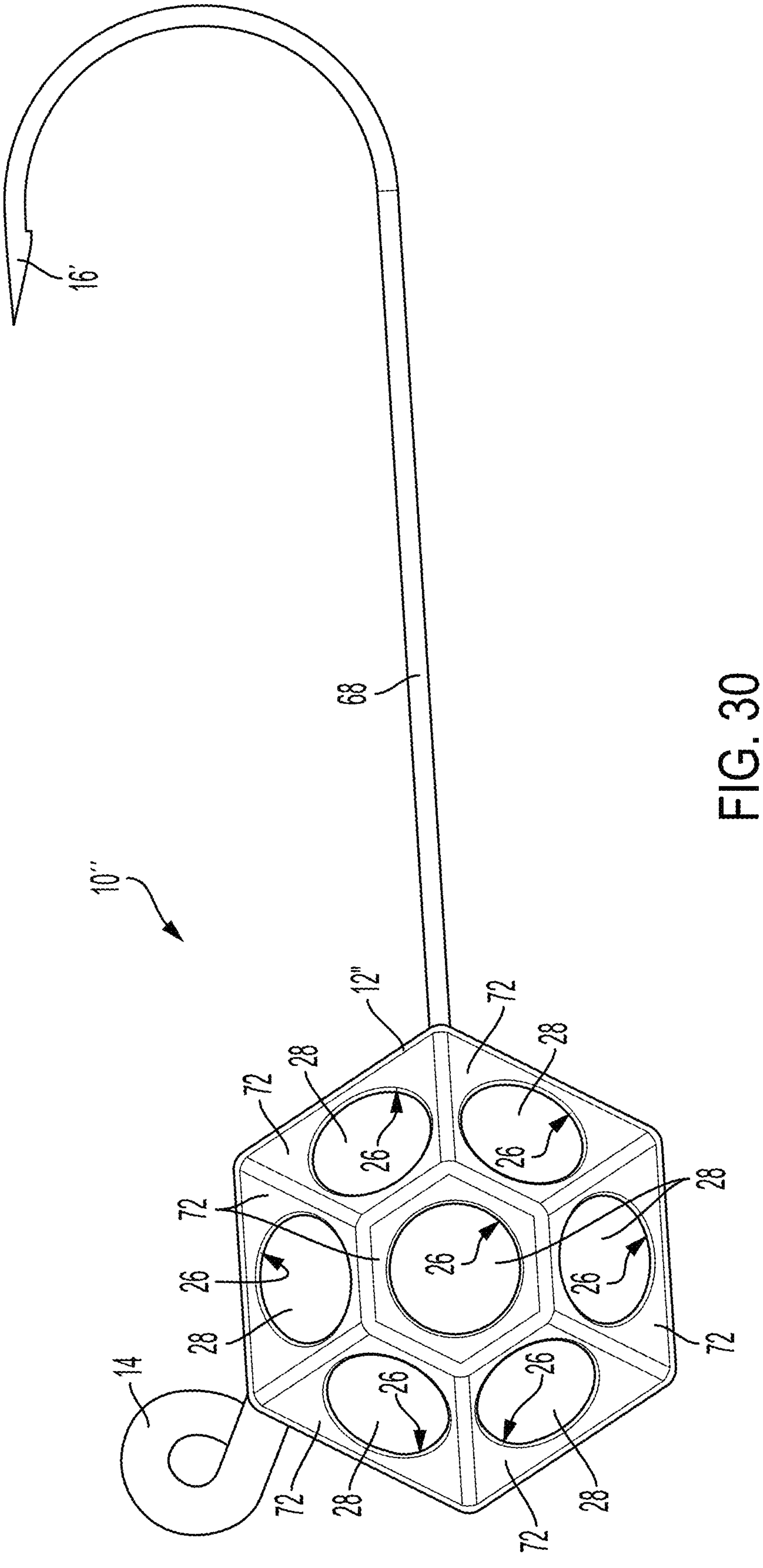
FIG. 30 is a side elevation view of the lure in FIG. 25.
Figure 31:
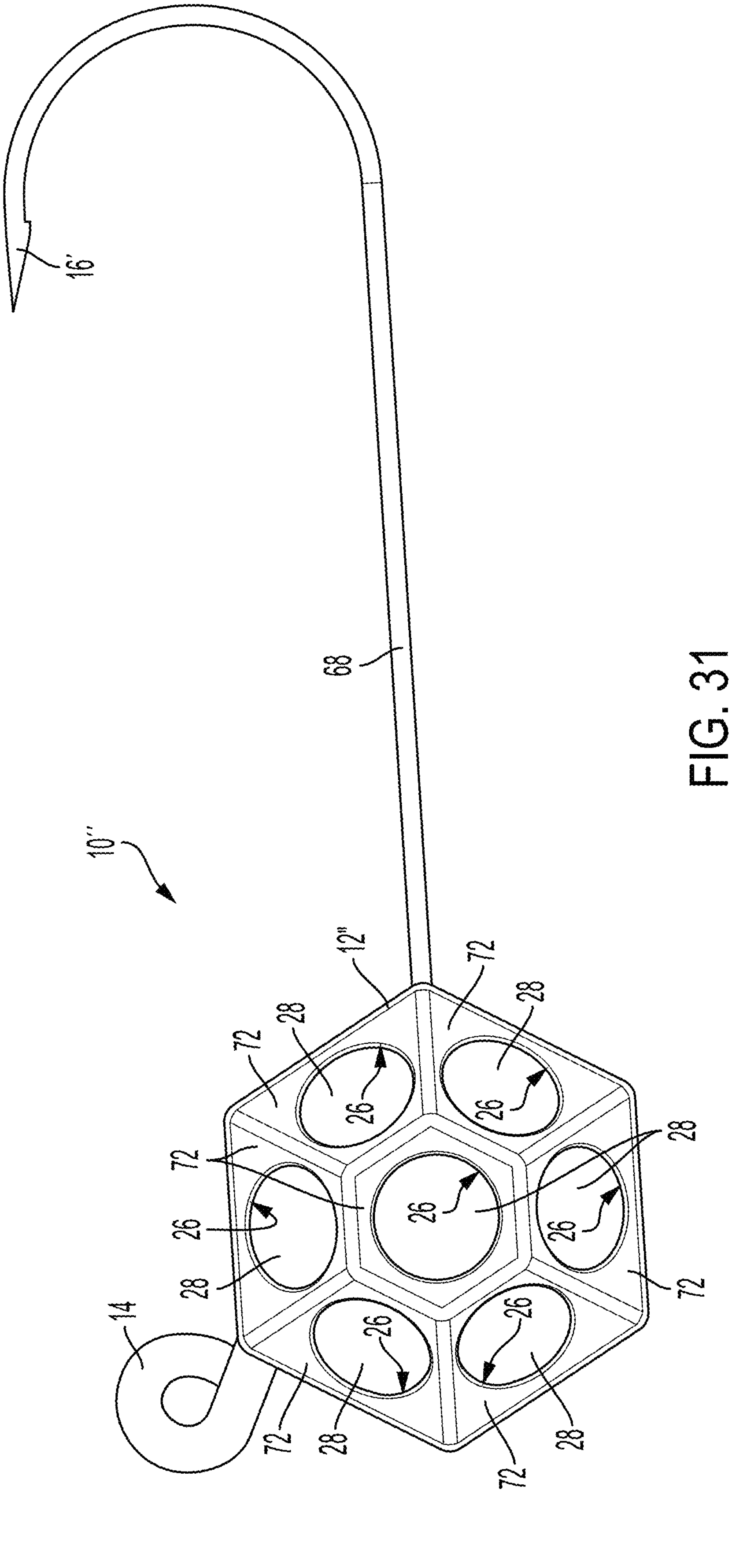
FIG. 31 is a different side elevation view of the lure in FIG. 25.

In another embodiment shown in FIGS. 17-25, the lure 10' is a jig. The jig 10' has a body 12', a line tie 14, a shank 68 and a hook 16'. The hook 16' may be attached to the body 12' by the shank 68. In one embodiment seen in FIG. 26, the jig 10' may also have hair 70 or a skirt around the shank 68 and/or hook 16'. The hair 70 helps hide the hook 16' and may also help the jig move through water, such as by helping prevent the hook from getting snagged or stuck on an unintended object, e.g. a branch or weeds, and/or slowing the fall of the jig in water.

The body 12' or head of the jig 10' may be any number of shapes, including round or spherical, football, the head of a fish, etc., the use of which would not defeat the spirit of the invention. A plurality of pieces of reflective material 28 may be attached to the body 12'. If, for example, the body 12' is round, each of the plurality of pieces of reflective material 28 may be at a different compound angle. The body 12' may also have a plurality of panels or surfaces 72.

In the embodiment seen in FIGS. 17-24, the body 12' of the jig 10' has a tetradecahedron shape. Each side of the body 12' of the jig 10' is a truncated hexagonal pyramid. Each panel or surface 72 of the body 12' has a reflective material 28 attached to it. In the embodiment seen in FIGS. 17-25, the reflective material 28 is triangular reflective stickers 74 attached to the face of the panels 72 of the body 12'.

In another embodiment shown in FIGS. 25-31, the lure 10" is also a jig and the body 12" of the jig is a hexagonal prism with a truncated hexagonal pyramid on each side. A pocket 26 is formed in each side or panel of the body 12". A reflective material 28 is attached to the back wall 30 of each pocket.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. Further, although certain advantages of different embodiments and disadvantages of certain prior art are described, no single claim must realize every or any benefit or overcome every or any disadvantage.

What is claimed is:

1. A lure comprising:

a body having a surface;

an eyelet attached to the body; and a hook fixedly attached to the body by a shank;

wherein a plurality of pieces of reflective material are attached to the surface of the body;

wherein a first one of the plurality of pieces of reflective material is at a first angle;

wherein a second one of the plurality of pieces of reflective material is at a first angle;

wherein the first angle of the first one of the plurality of pieces of reflective material is has a different magnitude than the first angle of the second one of the plurality of pieces of reflective material; and wherein the first one of the plurality of pieces of reflective material and the second one of the plurality of pieces of reflective material are both positioned on a first side of the body adjacent one another.

2. The lure of claim 1, wherein the first angle of the first one of the plurality of pieces of reflective material is a compound angle and the first angle of the second one of the plurality of pieces of reflective material is a compound angle.

3. The lure of claim 1, wherein the first one of the plurality of pieces of reflective material is the first angle away from a longitudinal axis of the lure and the second one of the plurality of pieces of reflective material is the first angle away from the longitudinal axis of the lure.

4. The lure of claim 1, wherein the body has a plurality of panels and each one of the plurality of pieces of reflective material is attached to different one of the plurality of panels.

5. The lure of claim 1, wherein the reflective material is a sticker.

6. The lure of claim 1, wherein the body has a plurality of panels and each one of the plurality of pieces of reflective material is located in a pocket formed in a different one of the plurality of panels.

7. The lure of claim 1, wherein at least three of the plurality of pieces of reflective material are on a first side of the body.

8. The lure of claim 1, wherein at least three of the plurality of pieces of reflective material are on a first side of the body.

9. The lure of claim 1, wherein the hook is fixedly attached to a rear side of the body by a shank and the first one of the plurality of pieces of reflective material is attached to the surface of the rear side of the body.

10. The lure of claim 1, wherein the eyelet is attached to a top side of the body and the first one of the plurality of pieces of reflective material is attached to the surface of the top side of the body.

11. The lure of claim 1, wherein the first one of the plurality of pieces of reflective material is a second angle away from a vertical axis of the lure;

wherein the second one of the plurality of pieces of reflective material is a second angle away from the vertical axis of the lure; and wherein the second angle of the first one of the plurality of pieces of reflective material is has a different magnitude than the second angle of the second one of the plurality of pieces of reflective material.

12. The lure of claim 11, wherein a cartesian plane of the first one of the plurality of pieces of reflective material is different than a cartesian plane of the second one of the plurality of pieces of reflective material.

13. The lure of claim 12, wherein at least two of the plurality of pieces of reflective material are on a second side of the body.

14. The lure of claim 13, wherein the first one of the plurality of pieces of reflective material on the first side of the body has a first angle that has the same magnitude as a first angle of a first one of the at least two of the plurality of pieces of reflective material on the second side of the body.

15. The lure of claim 14, wherein the first one of the at least two of the plurality of pieces of reflective material on the second side of the body has a second angle that is has the same magnitude as a second angle of the first one of the plurality of pieces of reflective material on the first side of the body.

16. The lure of claim 15, wherein a second one of the at least two of the plurality of pieces of reflective material on the second side of the body has a first angle that is has the same magnitude as the first angle of the second one of the plurality of pieces of reflective material on a first side of the body.

17. A bait comprising:

a body with a first side and a second side;

an eyelet attached to a top side of the body; and a hook attached to a back side of the body by a shank; and a plurality of pieces of reflective material attached to the body;

wherein the first side has a plurality of surfaces that form a truncated pyramidal shape; and wherein each one of the plurality of pieces of reflective material are attached to a different one of the plurality of surfaces of the first side of the body.

18. The bait of claim 17, further comprising a second plurality of pieces of reflective material;

wherein the second side has a plurality of surfaces that form a truncated pyramidal shape; and wherein each one of the second plurality of pieces of reflective material are attached to a different one of the plurality of surfaces of the second side of the body.

19. The bait of claim 17, wherein each one of the plurality of pieces of reflective material are stickers.

20. A lure comprising:

a body having a surface;

an eyelet attached to the body; and a hook fixedly attached to the body by a shank;

wherein a plurality of pieces of reflective material are attached to the surface of the body;

wherein at least two of the plurality of pieces of reflective material are on a first side of the body;

wherein at least two of the plurality of pieces of reflective material are on a second side of the body;

wherein a first one of the at least two of the plurality of pieces of reflective material on the first side of the body has a first angle that is the same as a first angle of a first one of the at least two of the plurality of pieces of reflective material on the second side of the body; and wherein the first one of the at least two of the plurality of pieces of reflective material on the first side of the body has a second angle that is the same as a second angle of the first one of the at least two of the plurality of pieces of reflective material on the second side of the body.

21. The lure of claim 20, wherein the first angle of the first one of the at least two of the plurality of pieces of reflective material on the first side of the body is different than a first angle of a second one of the at least two of the plurality of pieces of reflective material on the second side of the body.

* * * * *